(12) United States Patent
Wetzel et al.

(10) Patent No.: US 7,861,594 B2
(45) Date of Patent: Jan. 4, 2011

(54) APPARATUS AND METHOD FOR VIBRATORY TESTING

(75) Inventors: Joseph D. Wetzel, Hudsonville, MI (US); Steven P. Beavers, Hudsonville, MI (US); Randall J. Beekman, Dorr, MI (US)

(73) Assignee: Venturedyne, Ltd., Pewaukee, WI (US)

( * ) Notice: Subject to any disclaimer, the term of this patent is extended or adjusted under 35 U.S.C. 154(b) by 158 days.

(21) Appl. No.: 12/107,460

(22) Filed: Apr. 22, 2008

(65) Prior Publication Data

US 2009/0260444 A1    Oct. 22, 2009

(51) Int. Cl.
G01M 7/06 (2006.01)
B06B 1/12 (2006.01)
G01M 7/02 (2006.01)

(52) U.S. Cl. .......................................... 73/665; 73/671
(58) Field of Classification Search .................... 73/662, 73/665, 671
See application file for complete search history.

(56) References Cited

U.S. PATENT DOCUMENTS

| | | | |
|---|---|---|---|
| 2,438,756 A | | 3/1948 | Larsen |
| 2,609,791 A | * | 9/1952 | Bohlman .................... 91/239 |
| 3,646,807 A | * | 3/1972 | Gray et al. .................. 73/665 |
| 3,748,896 A | | 7/1973 | Barrows |
| 4,181,026 A | * | 1/1980 | Abstein et al. .............. 73/665 |
| 4,348,912 A | * | 9/1982 | Thomas ....................... 74/61 |
| 5,154,567 A | | 10/1992 | Baker et al. |
| 5,365,788 A | | 11/1994 | Hobbs |
| 5,493,944 A | | 2/1996 | Felkins et al. |
| 5,744,724 A | * | 4/1998 | Hobbs .......................... 73/665 |
| 2006/0027023 A1 | | 2/2006 | Hobbs |

* cited by examiner

*Primary Examiner*—Daniel S Larkin
*Assistant Examiner*—Rose M Miller
(74) *Attorney, Agent, or Firm*—Jansson Shupe & Munger Ltd.

(57) ABSTRACT

A method of operating a vibratory testing apparatus is disclosed including providing a table frame with at least one vibrator attached thereto and attaching the at least one vibrator to a solenoid valve, wherein an input of the solenoid valve is connected to a pneumatic air supply and an output of the valve is connected to the vibrator. The solenoid valve is connected to a controller and a first control signal is sent from the controller to the solenoid valve for opening the valve and allowing a first burst of air to the vibrator thereby causing the vibrator to vibrate the table frame at a first amplitude. Then a second control signal is sent from the controller to the solenoid valve for opening the valve and allowing a second burst of air to the vibrator thereby causing the vibrator to vibrate the table frame at a second amplitude.

24 Claims, 21 Drawing Sheets

APPARATUS AND METHOD FOR VIBRATORY TESTING

FIELD OF THE INVENTION

This invention is related generally to vibratory testing equipment and, more particularly, to a method for improved vibratory testing and a system for implementing that method.

BACKGROUND OF THE INVENTION

Few products are sold by their manufacturer without some type of testing being conducted. Such testing may be as simple as manually ascertaining whether certain parts are securely affixed—or as complex as "stress testing." In stress testing (or "stress screening" as it is sometimes called), products exhibiting "infant mortality" fail outright during the test. Or as the result of such testing, a product may display evidence of early failure in the operating environment.

One of the most common methods of stress testing involves testing a product by subjecting it to vibrations of the type, which might be encountered in actual product use. For example, U.S. Pat. No. 2,438,756 (Larsen) explains that the apparatus described therein is used to vibration-test electrical apparatus for airplanes, ships and the like. The unit described in U.S. Pat. No. 3,748,896 (Barrows) is said to be used for testing parts of a motor vehicle. And vibration testing is often conducted in conjunction with testing using another regimen, e.g., temperature.

One type of vibration testing is known as repetitive shock testing. Such testing is generally accomplished by utilizing a testing apparatus consisting of a table frame that is vibrated by a number of vibrators which impart vibration through impacts occurring in each vibrator. These vibrators are generally pneumatically powered. During the testing process a uniform vibration response is desirable because it ensures that all components being tested are exposed to approximately equal vibration levels over the entire table frame.

Many different vibrator designs have been developed for use in vibratory testing systems. The primary focus of these designs to date have been to create a vibrator that imparts vibration onto a table frame and thus onto the object to be tested. These designs vary the physical design of the vibrator in order to create a vibrator that is capable of free running when connected to a supply of pressurized air. For example, U.S. Pat. Nos. 5,154,567 to Baker et al., 5,365,788 to Hobbs, and 5,493,944 to Felkins et al. all utilize varied channels and/or cut-outs on the piston within the chamber to create a vibrator that is capable of tree running once connected to an air source. In all of these designs the strength of the impacts and the frequency of the impacts generally increases as the pressure of the air supply is increased. In addition, some vibrator designs, such as '788 patent to Hobbs, allow the vibrator to randomly vary the strength of the impacts through the mechanical design of the piston itself.

The performance of a vibrator is usually shown as a power spectral density (PSD) which can be depicted as a chart showing $g^2/Hz$ over a determined number of different frequencies (Hz). FIGS. 17 and 18 show two such examples. FIG. 17 shows the PSD of a typical, impactor free running at 30 Hz. As can be seen, the chart shows numerous peaks at the harmonies of 30 Hz; this is commonly known as the "picket fencing" of the PSD. As understood by those of skill in the art, these peaks are not desirable since they represent frequencies at which the product is not properly tested. As shown in FIG. 18, by modulating the air pressure into that typical vibrator the peaks of the "picket fence" are reduced and widened.

Another measurement of performance of vibrators is the acceleration imparted by each impact. As described above, in many typical vibrators as die pressure of the air supply is increased the amplitude of the acceleration and frequency of the impacts increase together. The effect is seen in FIGS. 8-10 which show the strength and number of impacts overtime at high, medium aid low pressures respectively.

OBJECTS OF THE INVENTION

It is an object of some embodiments of the invention to provide an improved method and apparatus for controlling the vibrators of a vibratory testing system that overcomes some of the problems and shortcomings of the prior art, including those referred to above.

Another object of some embodiments of the invention is to provide an improved method and apparatus for testing a product.

Another object of some embodiments of the invention is to provide an improved method and apparatus for running a vibratory testing apparatus that allows for control of the amplitude of tire acceleration, and/or frequency of the impacts within the vibrators.

Another object of some embodiments of the invention is to provide an improved method and apparatus for running a vibratory testing apparatus that efficiently utilizes pressurized air.

How these and other objects are accomplished will become apparent born the following descriptions and the drawings.

SUMMARY OF THE INVENTION

In a first embodiment of the present invention a method of operating a vibratory testing apparatus is disclosed. The method includes providing a table frame with at least one vibrator attached thereto and attaching the vibrator to a solenoid valve, wherein an input of the solenoid valve is connected to a pneumatic air supply and an output of the valve is connected to the vibrator. The solenoid valve is connected to a controller and a first control signal is sent from the controller to the solenoid valve for opening the valve and allowing a first burst of air from the pneumatic air supply to the vibrator thereby causing the vibrator to vibrate the table frame at a first amplitude. Then a second control signal is sent from the controller to the solenoid valve for opening the valve and allowing a second burst of air from the pneumatic air supply to the vibrator thereby causing the vibrator to vibrate the table frame at a second amplitude. The first amplitude is independent of the second amplitude.

In some embodiments the solenoid valve is a two-way valve, while in other embodiments the solenoid valve is a four-way valve. In preferred embodiments the at least one vibrator includes a sealed body having first and second ends and defining a cavity therein, the cavity having first and second ends. A first air passage is defined in the sealed body near the first end of the body and is configured to allow gas to flow to and from the first end of the cavity. A second air passage is defined in the sealed body near the second end of the body and is configured to allow gas to flow to and from the second end of the cavity. A piston is sealed within the cavity and moveable between the first and second ends.

In another embodiment, the solenoid valve is a four-way solenoid valve including an in port, two layout ports and an exhaust port. In such an embodiment the step of connecting the at least one vibrator to a solenoid valve includes connecting the first air passage to a first in/out port and connecting the second air passage to a second in/out port. In a preferred version of that embodiment the first burst of air causes the piston to impact the vibrator at the second end of the cavity and the second burst of air causes the piston to impact the vibrator at the first end of the cavity. In some versions the impact of the piston on the second end of the cavity includes a primary impact and at least one secondary impact, in highly preferred versions the impact of the piston on the first end of the cavity includes a primary impact and at least one secondary impact.

However, in other embodiments of the invention, the first air burst may cause the piston to impact at the second end and then return via gravity and/or rebounding to its starting point. The second burst will then cause the piston to impact again at the second end of the vibrator at an amplitude independent of the first impact. Each impact may still include a primary and secondary impacts before returning to the starting position.

In a further embodiment the controller varies the amount of time between the first burst of air and the second burst of air, thereby varying the amount of times per time period that the piston impacts either of the ends of the cavity. In a preferred version of that embodiment the controller randomly varies the number of impacts per time period.

In yet another embodiment, the method includes the step of attaching an accelerometer to the table frame and to the controller, whereby the controller receives data from the accelerometer and varies the amplitude of the impacts by the piston based upon data from the accelerometer. The controller can then independently vary the frequency of the impacts and the amplitude of the impacts.

In still further embodiments of the present invention a vibrator system for use with a vibratory testing table is disclosed. The vibrator system includes at least one vibrator having a sealed body with first and second ends and defining a cavity therein, the cavity having first and second ends. A first air passage is defined in the sealed body near the first end of the body and is configured to above gas to flow to and from the first end of the cavity. A second air passage is defined in the sealed body near the second end of the body and is configured to allow gas to flow to and from the second end of the cavity. A piston is sealed within the cavity and moveable between the first and second ends. A four-way solenoid valve having an in port, two in/outposts and an exhaust port and connects the first air passage of the vibrator to a first in/out port and the second air passage to a second in/out port. A pneumatic air supply is connected to the in port of the four-way solenoid valve and a controller is connected to the four-way solenoid valve, the controller capable of controlling the four-way solenoid valve to allow air from the pneumatic air supply to the vibrator in bursts. One burst moving the piston to impact with the body of the vibrator at one of the ends of the cavity and a subsequent burst moving the piston to impact with the body of the vibrator at the opposite end of the cavity, whereby the frequency of the impacts is controlled via the controller. In preferred versions the controller also is capable of controlling the amplitude of the impacts.

In another embodiment the vibrator system includes a plurality of vibrators. In a preferred version the system also includes a plurality of four-way solenoid valves, each four-way solenoid valve connected to one of the plurality of vibrators and connected to the controller.

In further embodiments the vibrator system includes a regulator connected to the system between the pneumatic air supply and the four-way solenoid valves, the regulator being controlled by the controller. Also a plurality of two-way solenoid valves may be attached. Each two-way solenoid valve is connected to the system between the pneumatic air supply and a four-way solenoid valve and connected to the controller and each two-way solenoid valve includes an in port connected to the pneumatic air supply and an out port connected to the in port of the four-way solenoid valve.

In yet another embodiment of the invention a method of controlling the movement of a piston of a vibrator as part of a vibratory testing apparatus is disclosed. The method includes providing a vibratory testing apparatus including at least one vibrator. The vibrator includes a piston enclosed within a cavity of the vibrator and power system attached to the vibrator for powering the vibrator. A controller is provided and attached to the power system, the controller being capable of controlling the power system. The controller activates a first burst of power from the power system to the vibrator, whereby the piston is moved within the cavity to impact within the vibrator at a first amplitude. Then the controller activates a second burst of power from the power system to the vibrator, whereby the piston is moved within the cavity to impact the vibrator at a second amplitude. The second amplitude is independent of the first amplitude. Therefore, the controller controls the frequency of impacts by controlling the amount of time between sending the first and second control signals.

The systems described herein can be powered via any method or manner known in the art such as electric, hydraulic or air power. However, in preferred versions, the power system is a pneumatic air system. It is preferred that the pneumatic air system includes a pneumatic air supply connected to a four-way solenoid valve, wherein the solenoid valve is connected to the at least one vibrator and to the controller. It is also preferred that the vibratory testing system includes a plurality of vibrators each connected to the pneumatic air supply via the four-way solenoid valve.

In still further versions of such embodiments, the pneumatic air system includes a plurality of four-way solenoid valves and each four-way valve is connected to a corresponding vibrator and the controller. In other embodiments the pneumatic air system includes a plurality of two-way solenoid valves and each two-way solenoid valve is connected to the pneumatic sir supply, a corresponding four-way solenoid valve and the controller.

DETAILED DESCRIPTION OF THE PREFERRED EMBODIMENTS

Figure 1:
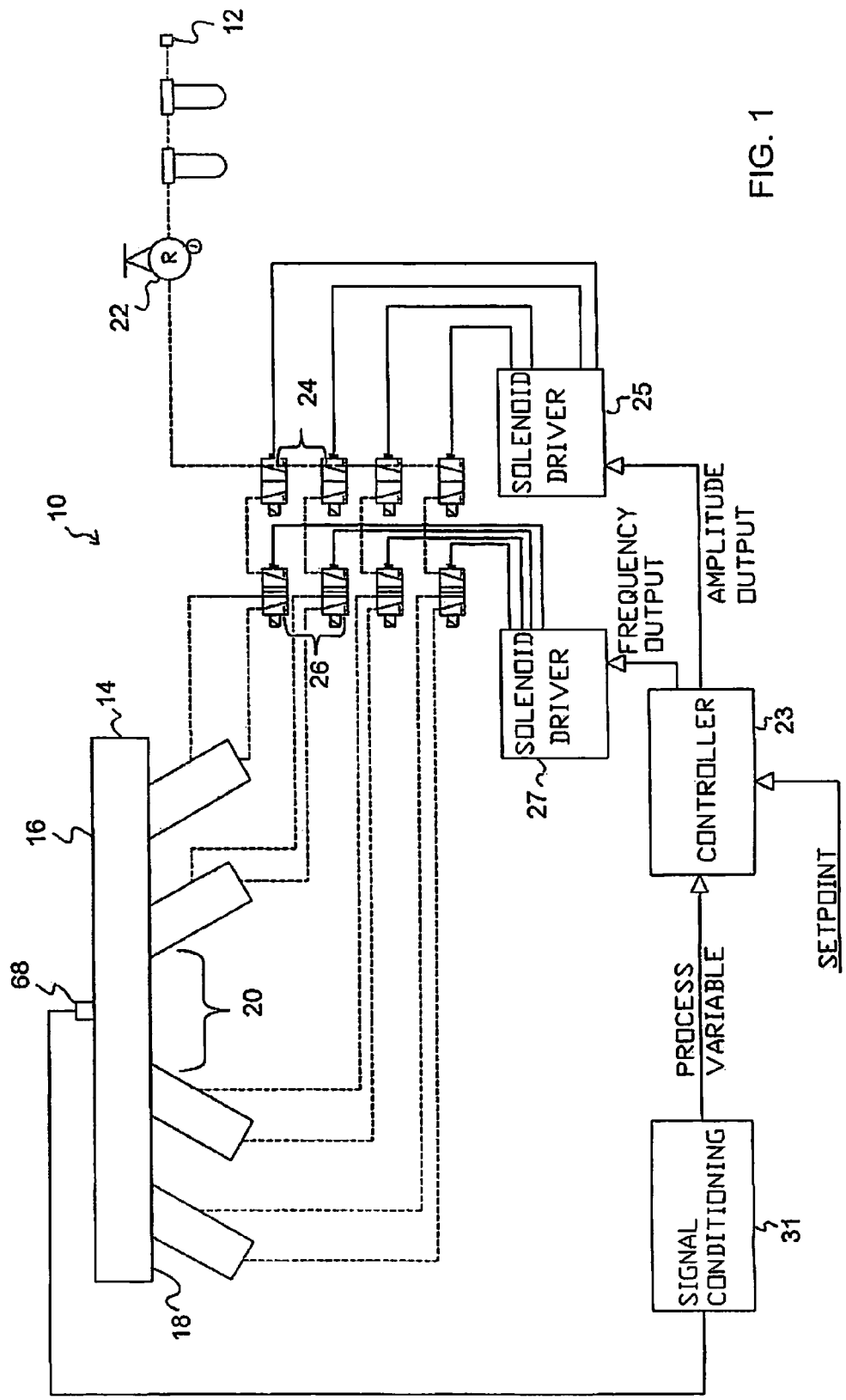
FIG. 1 is a schematic view of a vibratory testing system according to an embodiment of the present invention.

Referring now to FIG. 1, a schematic drawing of a preferred embodiment of a vibratory testing apparatus 10 is shown. In this embodiment the vibratory testing apparatus 10 is powered via compressed air from a pneumatic air supply 12. The vibratory testing apparatus includes a table frame 14 having a top side 16 and a bottom side 18. A plurality of vibrators 20 are attached to the bottom side 18 of the table frame 14 and serve to impart vibration energy to the table frame 14.

Figure 5:
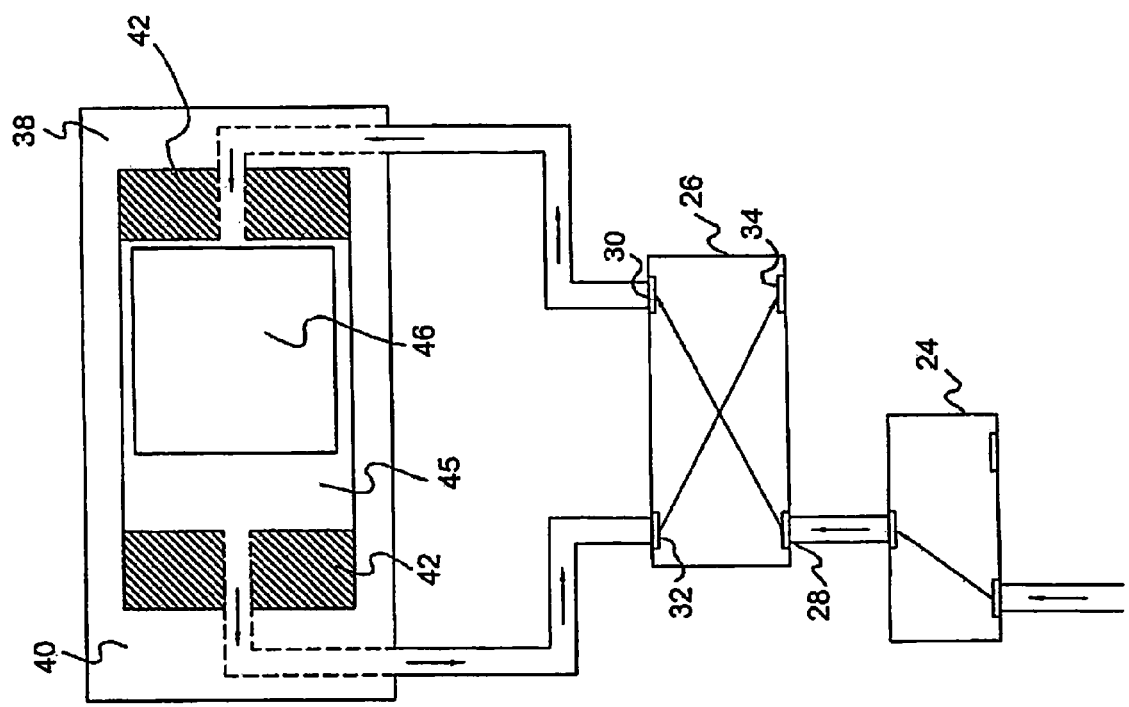
FIG. 5 is a schematic view of the operation of the vibrator in a first position.
Figure 6:
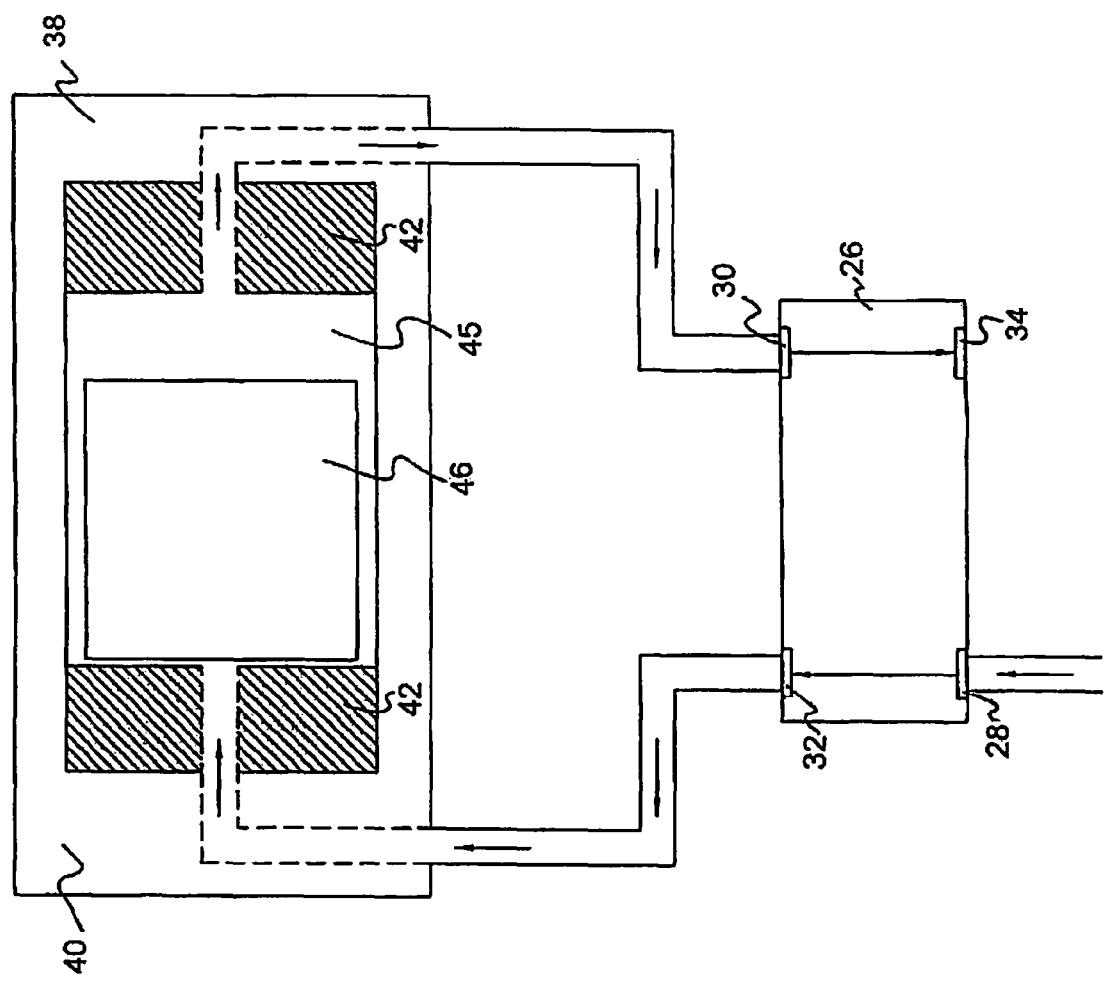
FIG. 6 is a schematic view of the operation of the vibrator in a second position.

The vibrators 20 are powered from the pneumatic air supply 12. The air supply 12 is first routed into a regulator 22 that regulates the air from the air supply 12 to a known pressure. From the regulator 22 the air supply 12 is fed to a plurality of electronically controlled two-way solenoid valves 24. As is understood in the art, all connections between the air supply 12 and the vibrators 20 are made through tubing capable of transporting the pressurized air front the air supply 12. In the schematic drawings these are represented by dotted lines between the connected parts. In this preferred embodiment there is one two-way solenoid valve 24 associated with each vibrator 20. From each two-way solenoid valve 24, air is supplied to a corresponding four-way solenoid valve 26. As shown in FIGS. 5 and 6, the airflow from the two-way solenoid valve 24 is connected, to the input 28 of the four-way solenoid valve 26. The four-way solenoid valve 26 also includes a first in/out port 30, a second in/out port 32 and an exhaust port 34. The first 30 and second 32 in/out ports are in turn connected to a vibrator 20.

Referring again to FIG. 1, each of the two-way valves 24 are connected to a first solenoid driver 25 and each of four-way valves 26 are connected to a second solenoid driver 27. The solenoid drivers 25, 27 are in turn connected to a controller 23. As is understood in the art, the solenoid drivers control the electrical signals that cause the solenoid valves 24, 26 to open and close. Furthermore, as would be understood by one of skill in the art the first 25 and second 27 solenoid drivers could be incorporated into a single driver. In the schematic view of FIG. 1, all electrical connections between the various parts of the vibratory testing apparatus 10 are shown as solid lines. The controller 23 sends activation signals to the solenoid drivers 25, 27, thereby causing the valves to switch between positions.

Figure 2:
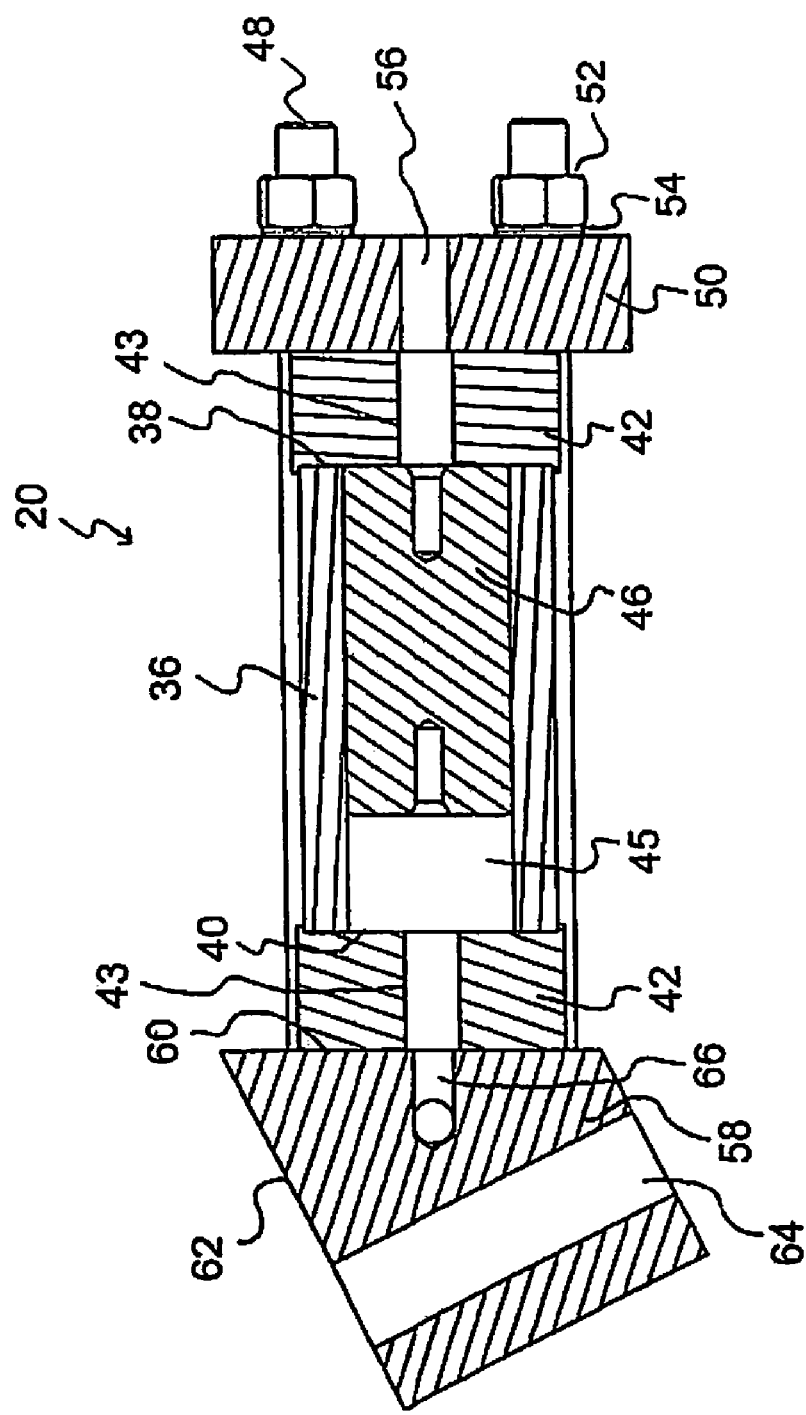
FIG. 2 is a sectional view of a vibrator of the system of FIG. 1 in a first position.
Figure 3:
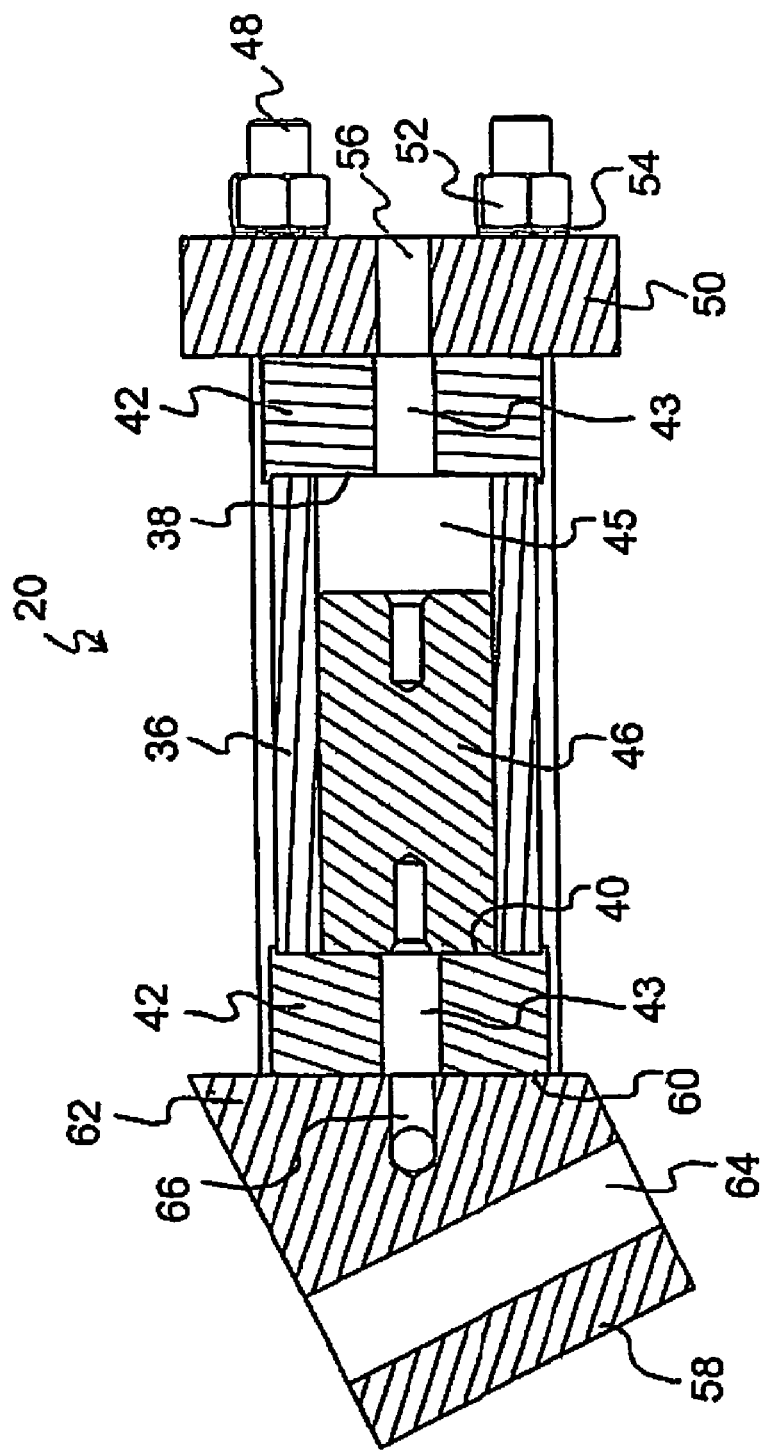
FIG. 3 is a sectional view of a vibrator of the system of FIG. 1 in a second position.

Referring now to FIGS. 2 and 3, cut-away drawings of a preferred embodiment of a vibrator 20 is shown. The vibrator 20 includes a sleeve 36 giving the vibrator 20 opposite first 38 and second 40 ends. An impact block 42 is disposed at each of the first 38 and second 40 ends of the sleeve 36. The sleeve 36 defines an interior cavity 45 of the vibrator. Each of the impact blocks 42 includes a passage 43 that allows air to flow from outside of the vibrator 20 into the interior cavity 45. A piston 46 is disposed slidably within the interior cavity 45 of the sleeve 36. It is preferred that the sleeve 36 and the piston 46 are fitted to limit air passage between them without the use of o-rings or the like.

At the impact block 42 of the second end 40 of the vibrator 20, the vibrator 20 is attached to a mounting block 58. The mounting block 58 includes a vibrator side 60 attached to the vibrator 20 and a mounting side 62 for attachment to the table frame 14. Generally attachment to the table frame 14 is accomplished via bolts or the like (not shown) which pass through a mounting sleeve 64 of the mounting block 58 as is known in the art. The mounting block 58 further includes a second port 66 which is aligned in communication with the passage 43 of the impact block 42 at the second end 40 of the vibrator 20. Therefore, this second port 66 allows passage into the interior cavity 45 of the vibrator 20.

Figure 4:
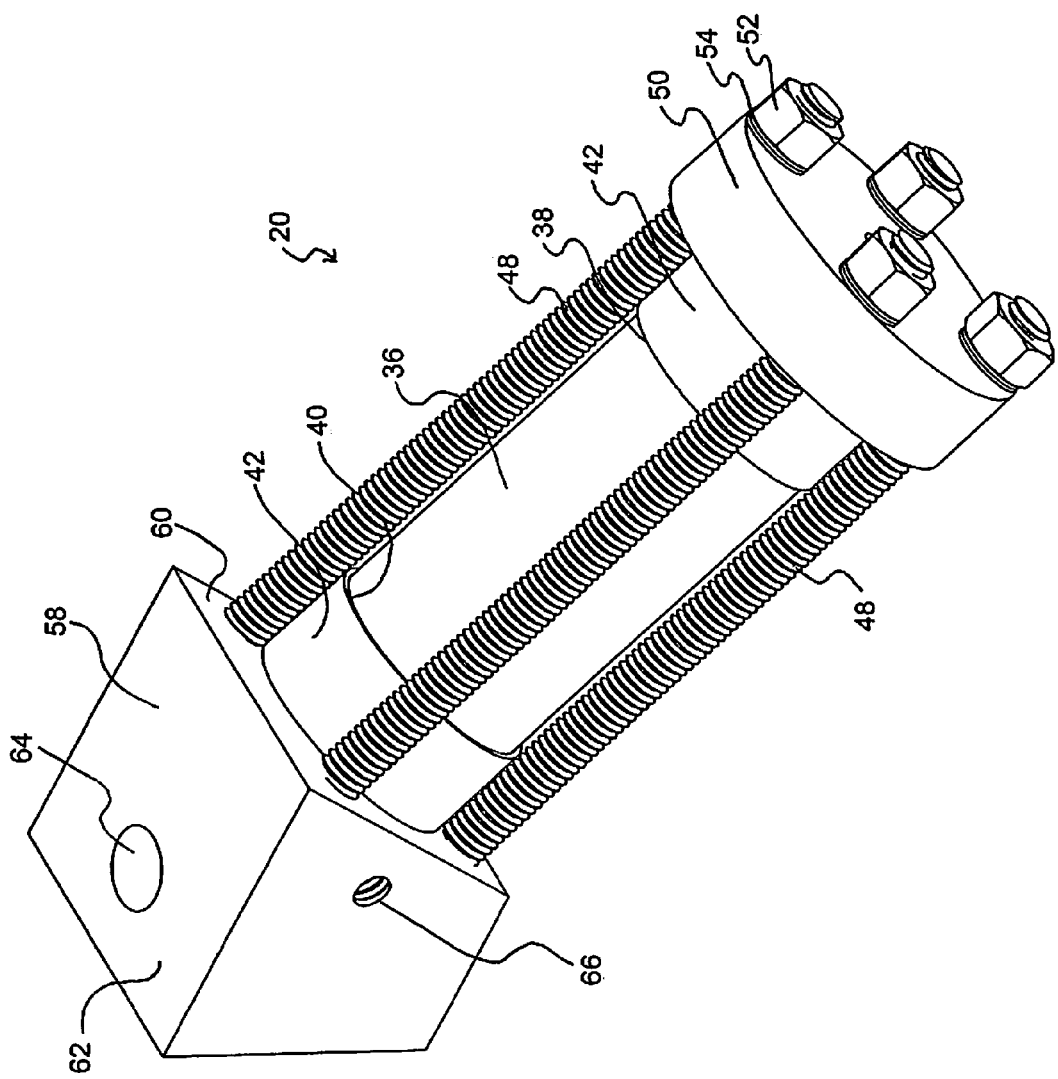
FIG. 4 is a perspective view of the vibrator of FIGS. 2 and 3.

As can be best seen in FIG. 4, a set of rods 48 extend from the vibrator side 60 of the mounting block 58 and extend past the first end 38 of the sleeve 36. An endcap 50 is fit over the rods 48 and is secured to the vibrator 20 via a nut 52 and washer 54 arrangement. The endcap 50 further includes a first port 56 that is aligned in communication with the passage 43 of the impact block 42 at the first end 38 of the vibrator 20. Therefore, this first port 56 (FIGS. 2 and 3) allows passage into the interior cavity 45 of the vibrator 20.

Referring now to FIGS. 5 and 6, the operation of the vibrators 20 is shown schematically. Air flows from the pneumatic air supply 12 and into each individual two-way valve 24. The two-way valve 24 serves to supply pressure to the in port 28 of the four-way valve 26. It is preferred that pressure be supplied via either of two methods. In a first method the two-way valve 24 is almost directly connected to the four-way valve 26. Thus, when the two-way valve 24 is put into an open position air flows directly into the four-way valve 26 and the amount of pressure supplied to the four-way valve 26 is close to a direct ratio of the amount of air passed through the two-way valve 24 each time it is opened or cycled. In a second method the two-way valve 24 and the four-way valve 26 are separated by a length of line between them allowing a build-up of pressurized air between the valves. In this second method the purpose of the length of line is to remove any substantial effect on the pressure in the line when the four-way valve 26 cycles. Thus, the size or length of this line is based upon the volume of the air within the line; since minimizing pressure change in the line would be accomplished by each cycling of the four-way valve not substantially (preferably less than a +/−5% change in pressure) effecting the pressure in the line. As a result, when the two-way valve 24 is opened, air flows into the line rather than directly into the four-way valve 26 and the timing of the operation of the four-way valve 26 is independent of the operation of the two-way valve 24. However, intermediate lengths or volumes of line can be utilized that range between these two methods. For example, a volume of line that allows +/−30% change has been utilized.

The first in/out port 30 of the four-way valve 26 is connected to the first port 56 of the vibrator 20. The second in/out port 32 is connected to the second port 66 of the vibrator 20. In FIG. 5 the four-way valve 26 is shown to a first position. In this first position, air from the two-way valve 24 flows through the in port 28 of the four-way valve 26 and into the vibrator 20 through the first in/out port 30. The air enters the vibrator 20 through the first port 56 via the associated passage 43 and into the cavity 45. This flow of air is triggered by the controller 23 which causes a first control signal to the second solenoid driver 27 to open the connection between the in port 28 and the first in/out port 30 of the four-way valve 26. This flow of air causes the piston 46 to move within the cavity 45 of the sleeve 36 from its starting position at or near the first end 38 of the vibrator 20 toward the second end 40 of the vibrator 20.

Simultaneously, the second in/out port 32 of the four-way valve 26 is connected to the exhaust port 34 of the four-way valve 26. Therefore, as the piston 46 moves within the cavity 45 the air within the cavity 45 opposite the first end 38 is expelled. The piston 46 then continues its movement and impacts upon the impact block 42 at the second end 40 of the vibrator 20. In this preferred embodiment, the piston 46 rebounds from this primary impact partially back toward the first end 38 of the vibrator 20. The remaining pressure from the four-way valve 26 into the cavity 45 at the first end 38 of the vibrator 20 then causes the piston 46 to have a secondary impact with the impact block 42 at the second end 40 of the vibrator 20. There may be a series of secondary impacts based upon the pressure utilised.

Referring now to FIG. 6, the controller 23 then sends a second control signal to the second solenoid driver 27 which causes the four-way valve 26 to switch to a second position and connect the in port 28 to the second in/out port 32. In this second position, air from the two-way valve 24 flows through the in port 28 of the four-way valve 26 and into the vibrator 20 through the second in/out port 32. The air enters the vibrator 20 through the second port 66 through the associated passage 43 and into the cavity 45. This flow of air causes the piston 46 to move within the cavity 45 of the sleeve 36 from its starting position at or near the second end 40 of the vibrator 20 toward the first end 38 of the vibrator 20.

Simultaneously, the first in/out port 30 of the four-way valve 26 is connected to the exhaust port 34 of the four-way valve 26. Therefore, as the piston 46 moves within the cavity 45 the air within die cavity 45 opposite the second end 40 is expelled. The piston 46 then continues its movement and impacts upon the impact block 42 at the first end 38 of the vibrator 20. In this preferred embodiment, the piston 46 rebounds from this primary impact partially back toward the second end 40 of the vibrator 20. The continued pressure from the four-way valve 26 into the cavity 45 at the second end 40 of the vibrator 20 then causes the piston 46 to have a secondary impact with the impact block 42 at the first end 38 of the vibrator 20. There may be a series of secondary impacts based upon the pressure utilized. In most operations because of the speed at which the switching occurs, the secondary impacts would continue to occur until the controller 23 sends another control signal to the valve 26 to switch back to the first position.

Through the use of this method of operation both the frequency of the impacts and the amplitude of the impacts can be controlled. The frequency of the impacts is controlled by the controller 23 which sends control signals to the second solenoid driver 27 thus controlling each opening and closing of the four-way valve 26. Each primary impact is the result of the controller 23 signaling the four-way valve 26 to switch positions and each switch is equal to one primary impact. The amplitude of the impacts is controlled via the amount of pressure supplied to the four-way valve 26 for each impact. The controller 23 sends control signals to the first solenoid driver 25 causing the two-way valve 24 to open and close to regulate the amount of pressurized air coming into the four-way valve 26. During the operation of the vibration testing apparatus 10 an accelerometer 68 may be positioned on the table frame 14 and connected to the controller 23. As is known in the art the controller 23 can then utilize data from the accelerometer 68 to determine how to control the vibrators during the continuing operation. This is accomplished by conditioning the signal from the accelerometer (reference number 31 in FIG. 1 represents this signal conditioning) to produce a process variable. This process variable is then compared by the controller to the setpoint which has been entered into the controller. The controller then varies the amplitude of the impacts based upon if the process variable is higher or lower than the setpoint.

Figure 7:
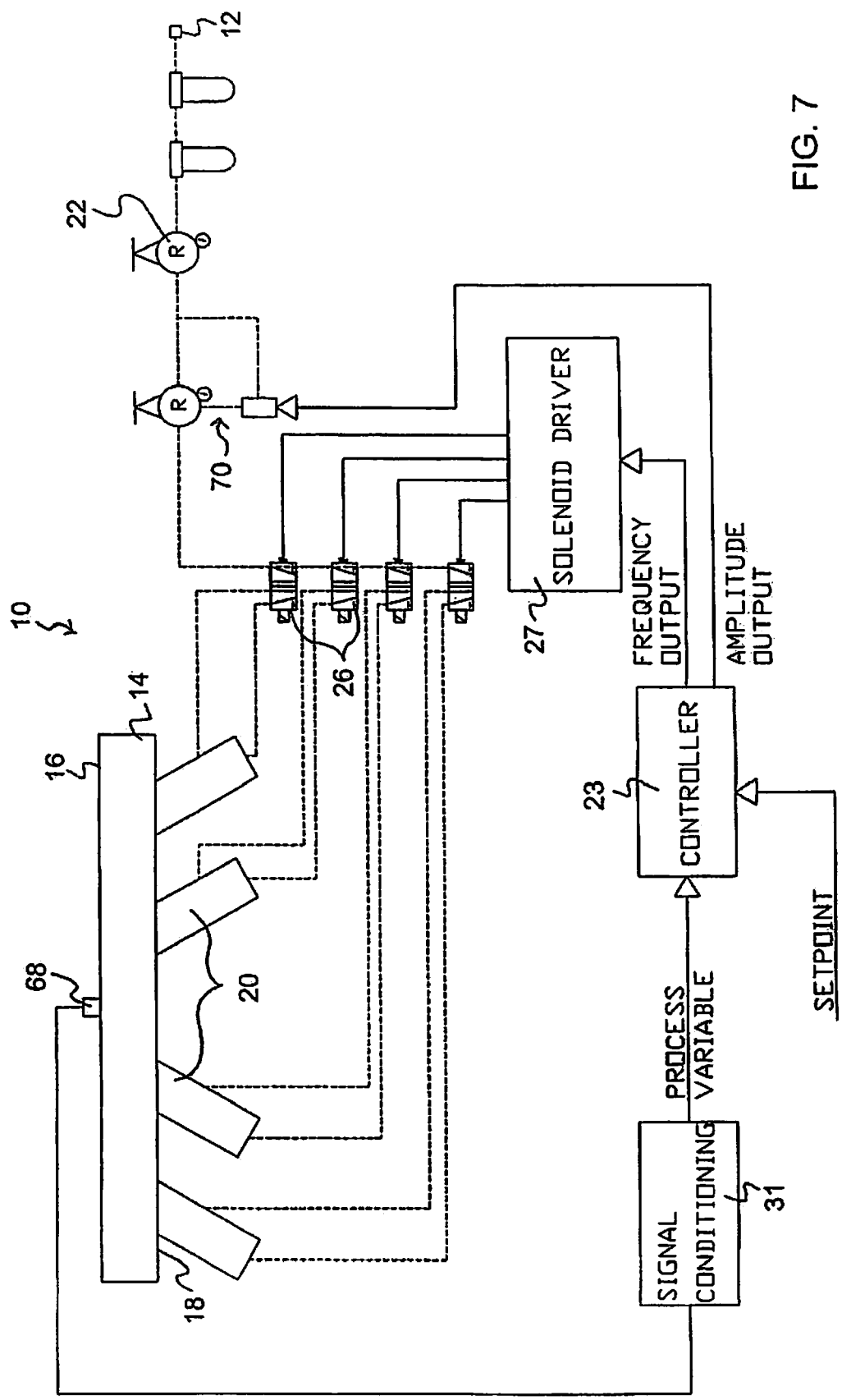
FIG. 7 is a schematic view of a vibratory testing system according to an alternative embodiment of the present invention.

Referring now to FIG. 7 an alternative embodiment of a vibratory testing apparatus 10 is shown. In this embodiment a single pilot controlled regulator 70 is utilized to supply air to the four-way valves 26. This pilot controlled regulator would preferably be in addition to the primary regulator 22 of the pneumatic air supply 12. The pilot controlled regulator system 70 is attached to the controller 23 which can thereby regulate the pressure being sent to the four-way valves 26. Otherwise the operation of the embodiment is the same as described above.

Figure 8:
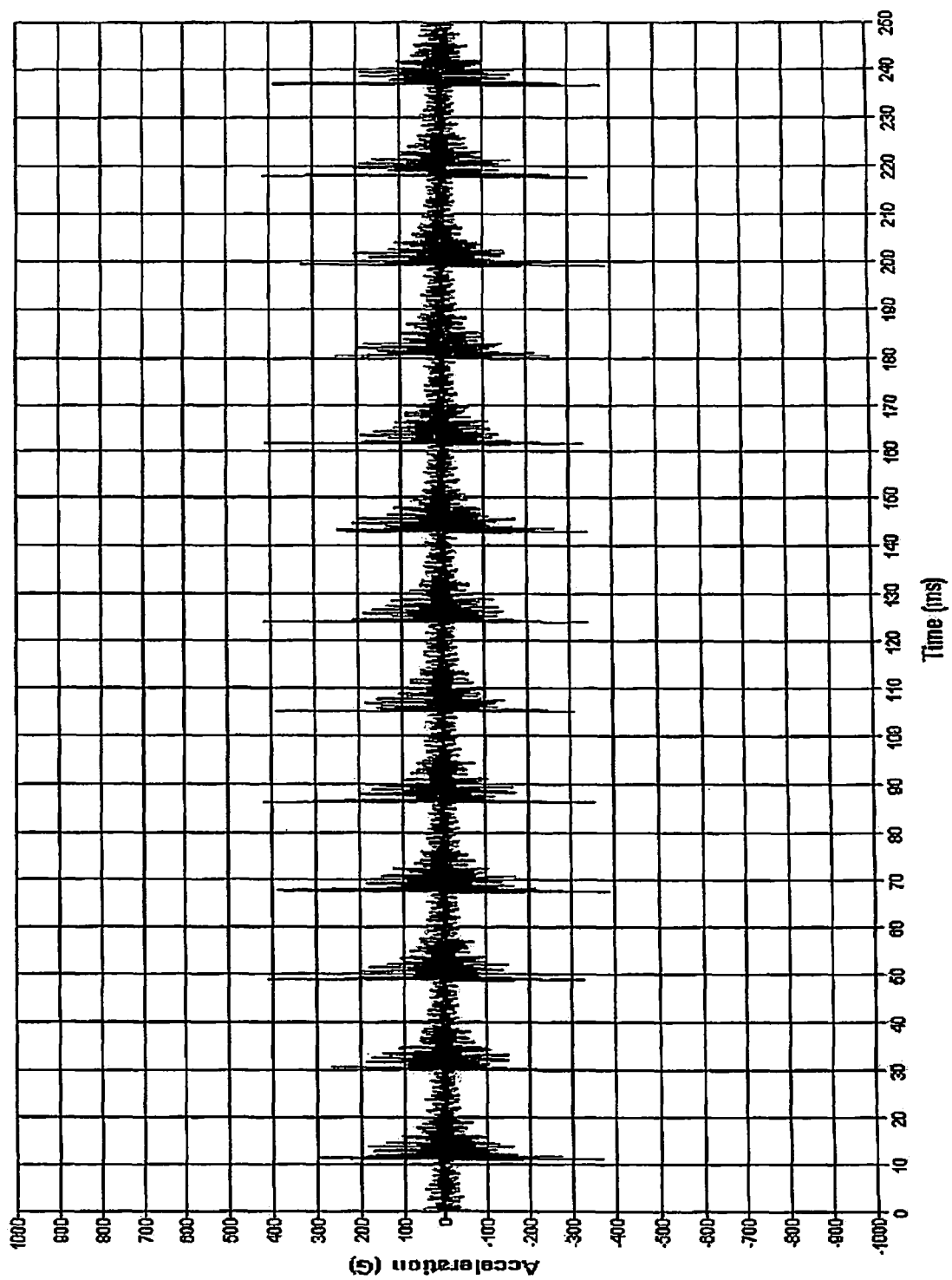
FIG. 8 is an acceleration chart of a prior art system operating at high pressure.
Figure 9:
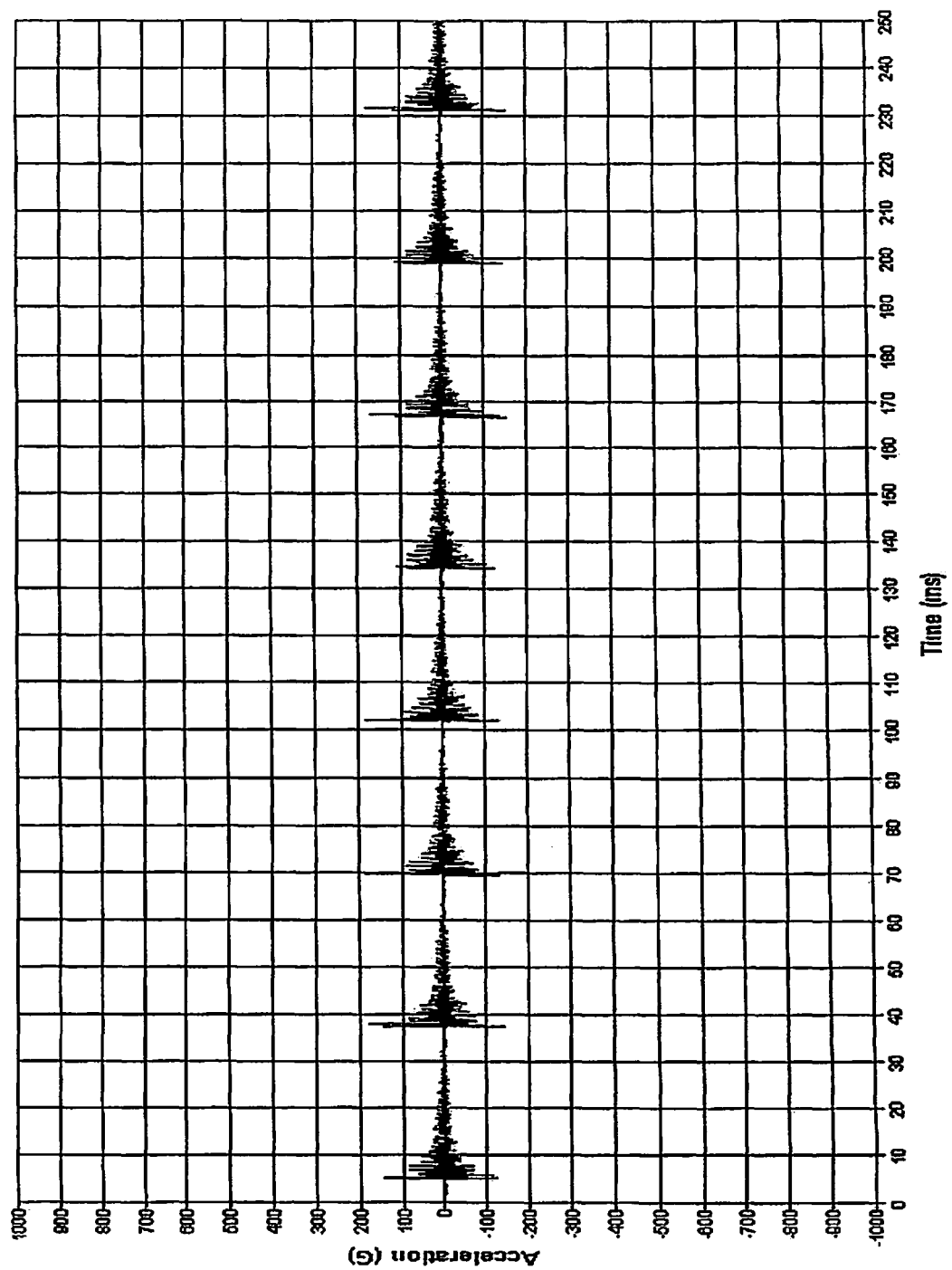
FIG. 9 is an acceleration chart of a prior art system operating at medium pressure.
Figure 10:
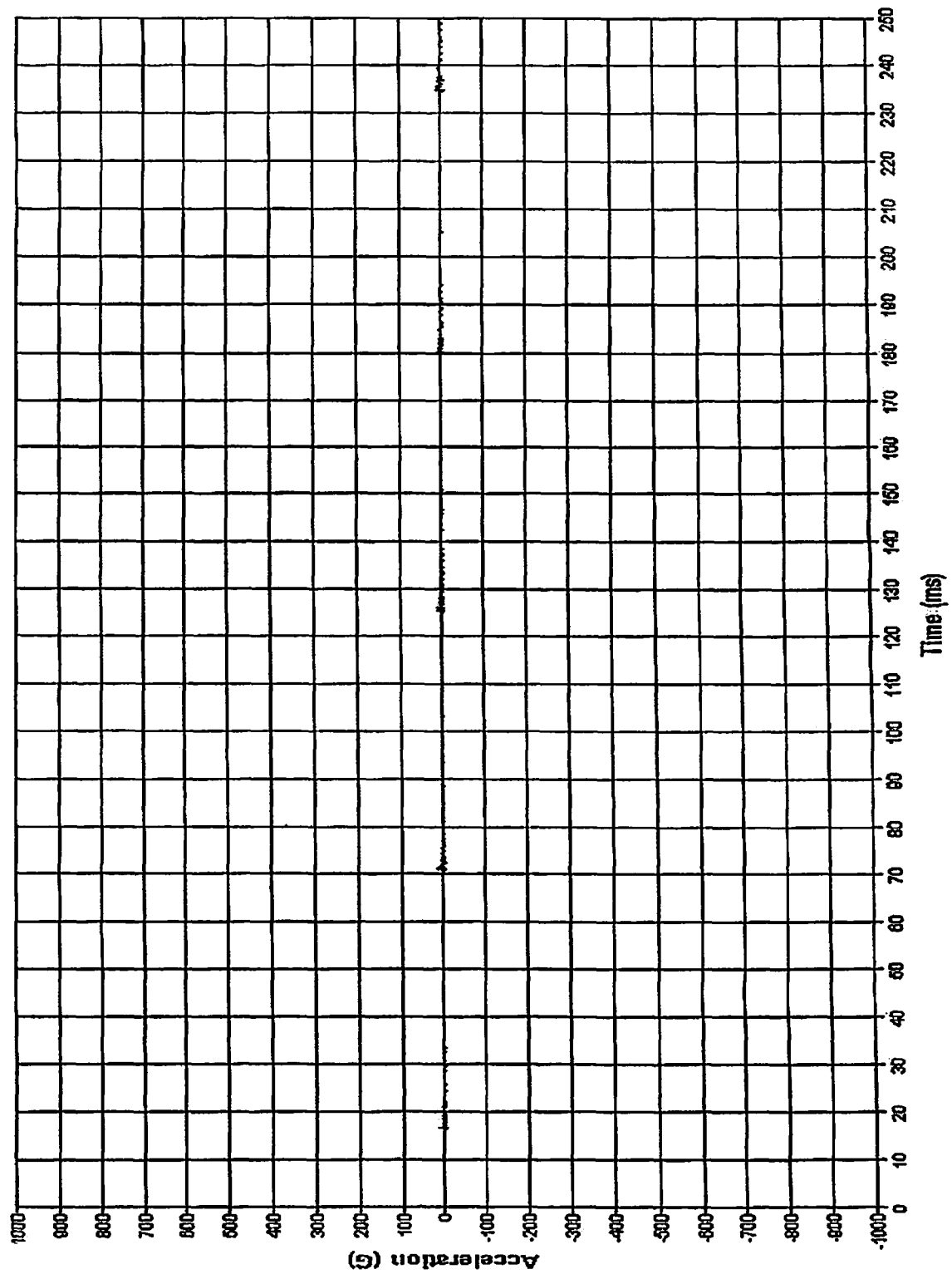
FIG. 10 is an acceleration chart of a prior art system operating at low pressure.
Figure 11:
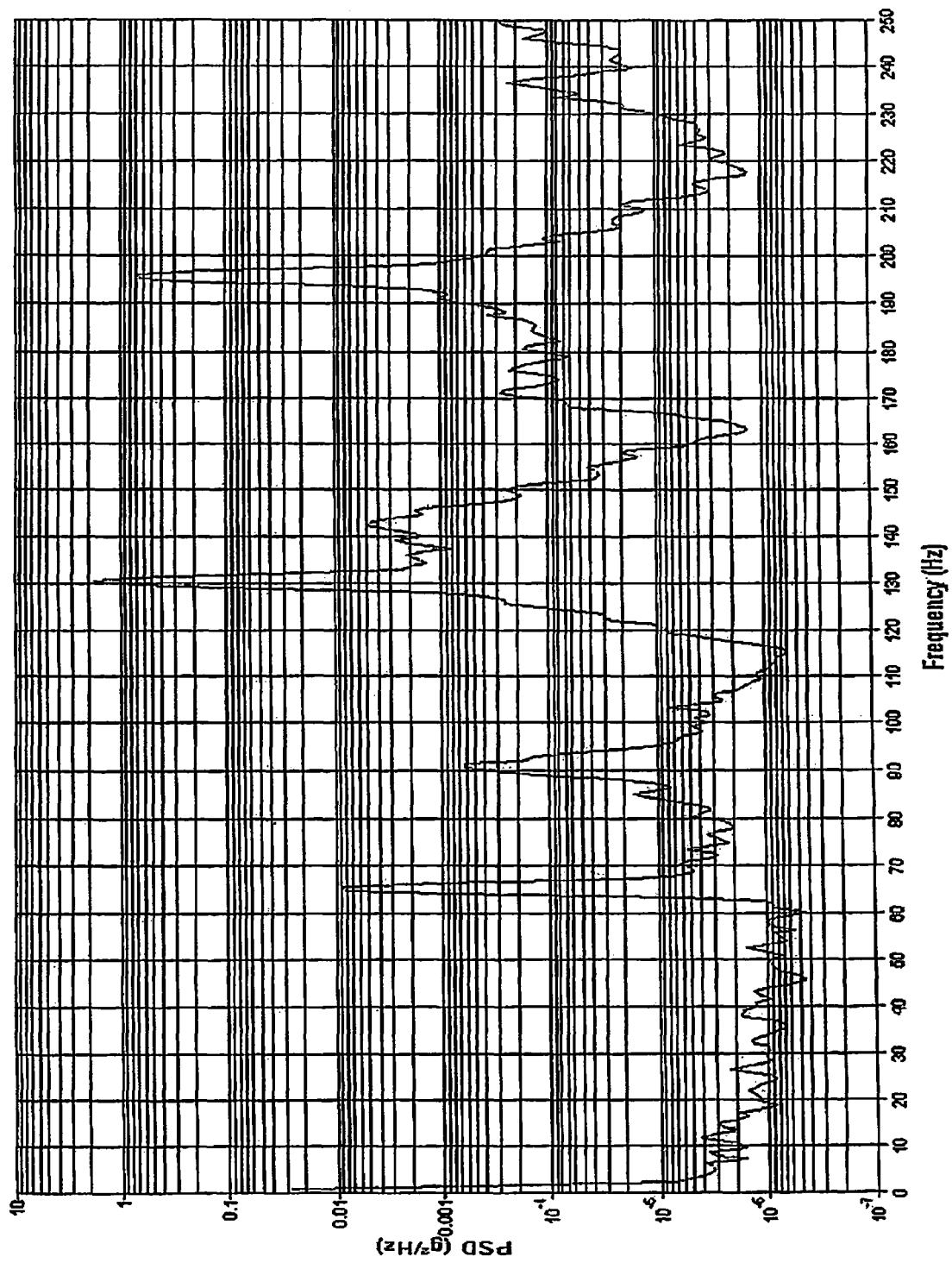
FIG. 11 is a PSD chart of a prior art system operating at 65 Hz.
Figure 12:
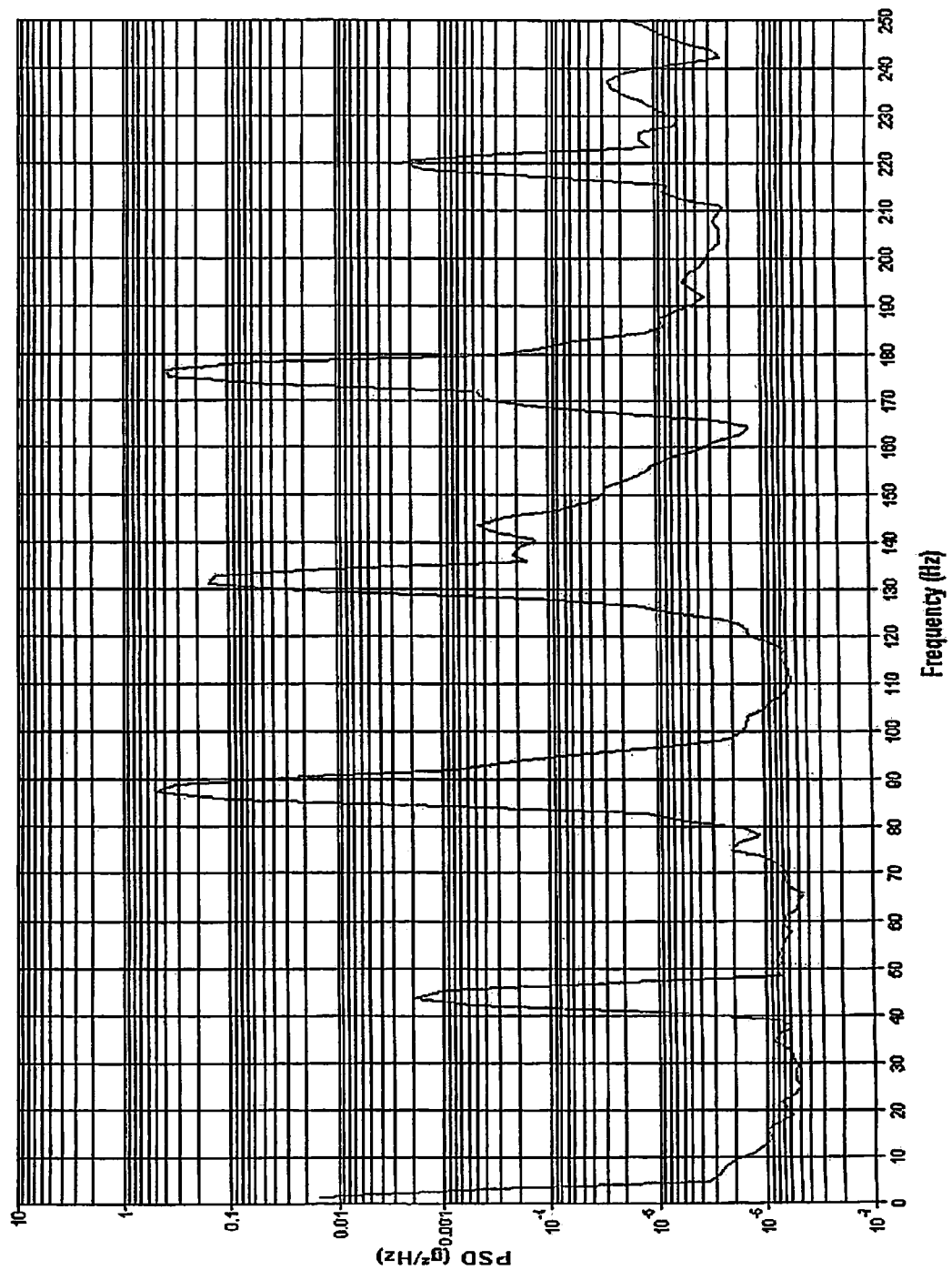
FIG. 12 is a PSD chart of a prior art system operating at 45 Hz.

The operation of either of these embodiments allows for improved performance over prior vibratory testing systems. As discussed in the background section, typical vibration systems currently utilized in the held impart energy based upon vibrators that are free-running. This means that the vibrators run on a generally constant air feed and that the frequency and amplitude of the impacts within the vibrator are directly tied to each other. A decrease in the air supply pressure results in a decrease of both the vibrator operating frequency and the amplitude of the impact. FIGS. 8-10, show the operation of prior art vibrators in the Time Domain. The Time Domain graphs show that as the air supply pressure is decreased both the amplitude of the impact measured in acceleration (g) and the operating frequency measured in (Hz) decrease. This is typical of the prior art vibrator. FIGS. 11 and 12 show the prior art vibrator operated at 65 Hz and 44 Hz to get acceleration levels of 50 grms and 25 grms respectfully. The first large spike is the vibrator operating frequency and show a decrease from 65 Hz to 44 Hz to lower the acceleration level from 50 grms to 25 grms. Note that the vibrator can not operate at 44 Hz to get an acceleration level of 50 grms or 65 to get an acceleration level of 25 grms.

Figure 13:
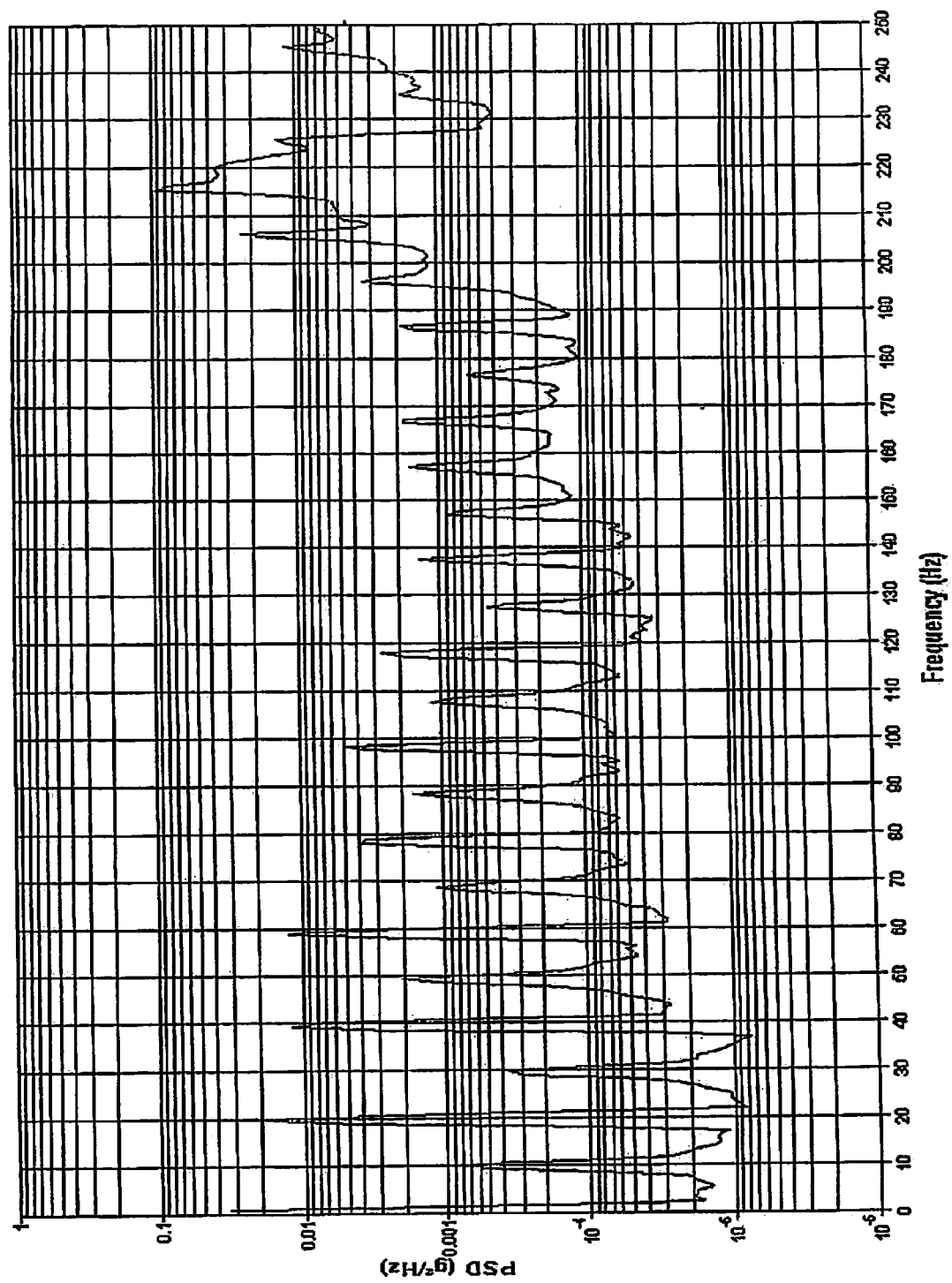
FIG. 13 is a PSD chart of the result of the system of FIG. 1 operated at 10 Hz with a 50 grms setpoint.
Figure 14:
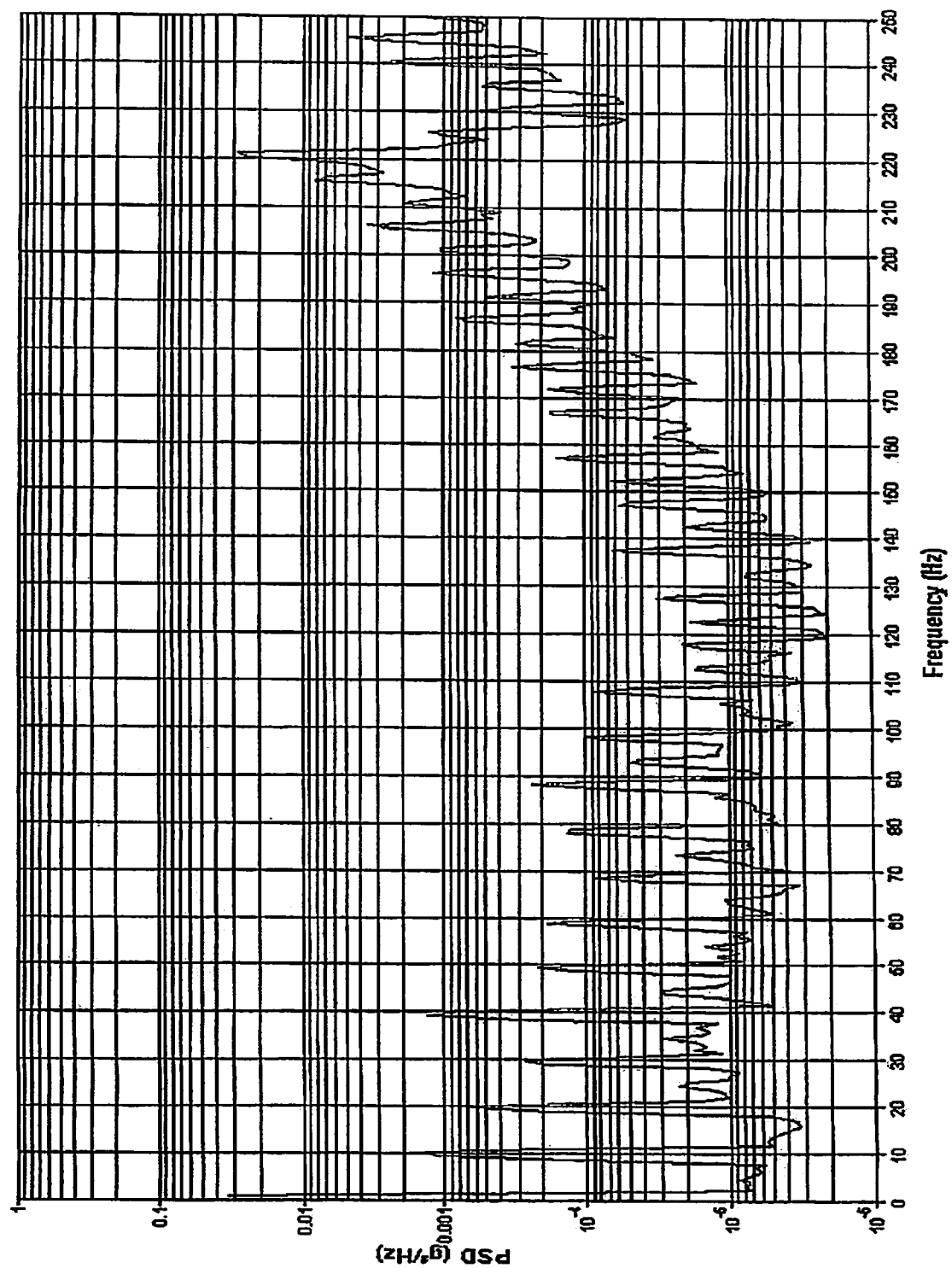
FIG. 14 is a PSD chart of the result of the system of FIG. 1 operated at 10 Hz with a 50 grms setpoint.
Figure 15:
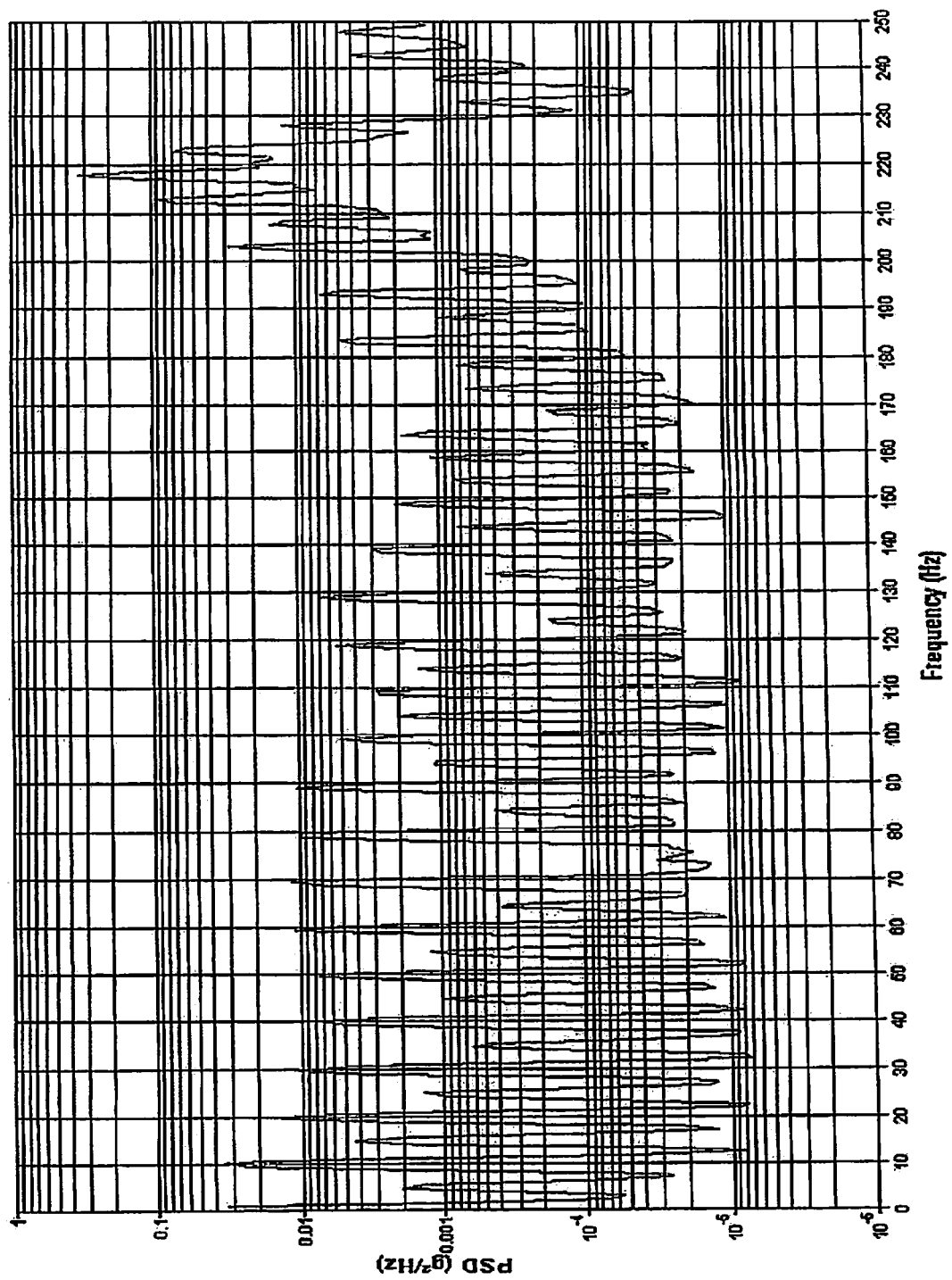
FIG. 15 is a PSD chart of the result of the system of FIG. 1 operated at 5 Hz with a 50 grms setpoint.
Figure 16:
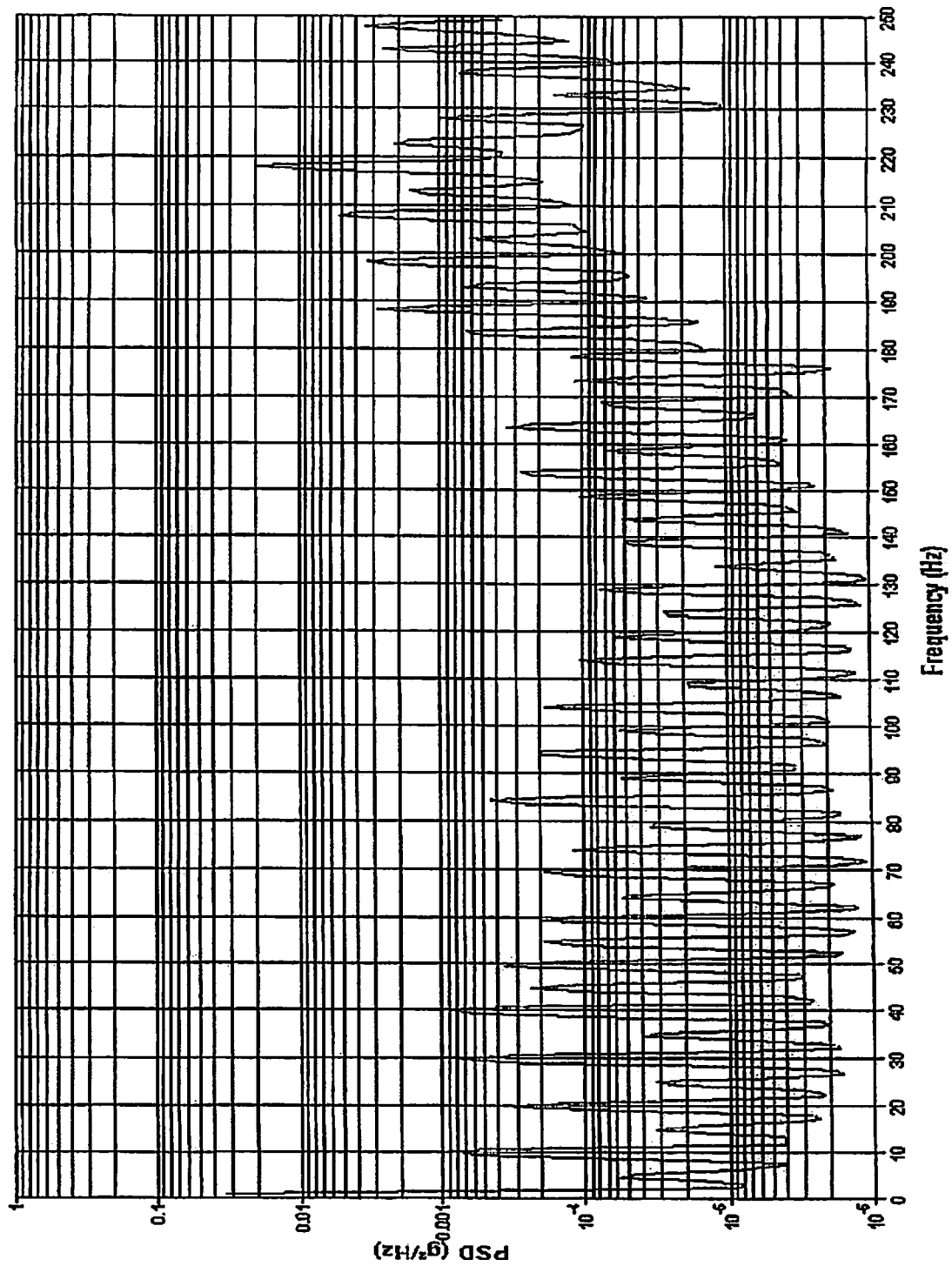
FIG. 16 is a PSD chart of the result of the system of FIG. 1 operated at 5 Hz with a 25 grms setpoint.

In comparison, FIGS. 13 and 14 show that the preferred embodiment vibrators described above can be operated at a set frequency (10 Hz) but at different acceleration levels (grms). The grms levels shown are 50 and 25 respectfully. The only way that the acceleration level can change while operating the vibrator at 10 Hz frequency is that the amplitude of the impacts has to change. The controller can decrease the air supply pressure therefore the amplitude of the impacts can decrease while operating the vibrator at a constant frequency of 10 Hz. FIGS. 13 and 14 show that the amplitude of the impact is not dependent on the operating frequency as with the prior art. With the prior art, the vibrator operating frequency would have significantly decreased from a 50 grms acceleration level to a 25 grms acceleration level. The solenoid controlled vibrators described above operating at a set 10 Hz frequency is not limited to 50 grms or 25 grms but it is just as easily controlled to 1, 2 3, 4 or 50 grms or any value in between, above or below. This is accomplished by the controller adjusting only the amplitude of the impact while maintaining the 10 Hz operating frequency. Conversely the operating frequency can also be adjusted independently of the grms. This is shown in FIGS. 15 (50 grms) and 16 (25 grms) while operating at a frequency of 5 Hz.

Figure 17:
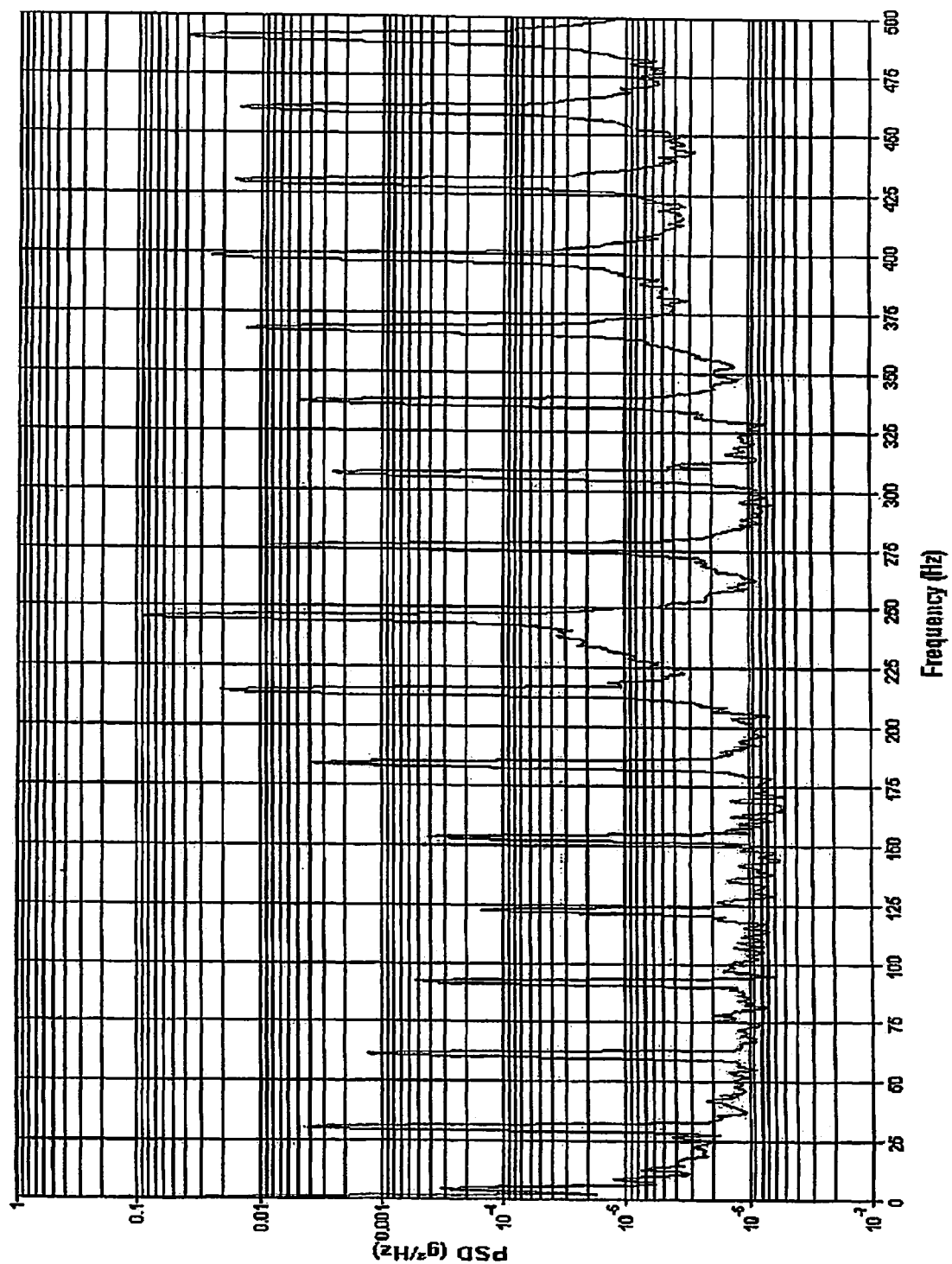
FIG. 17 is a PSD chart of a prior art system free-running at 30 Hz.
Figure 18:
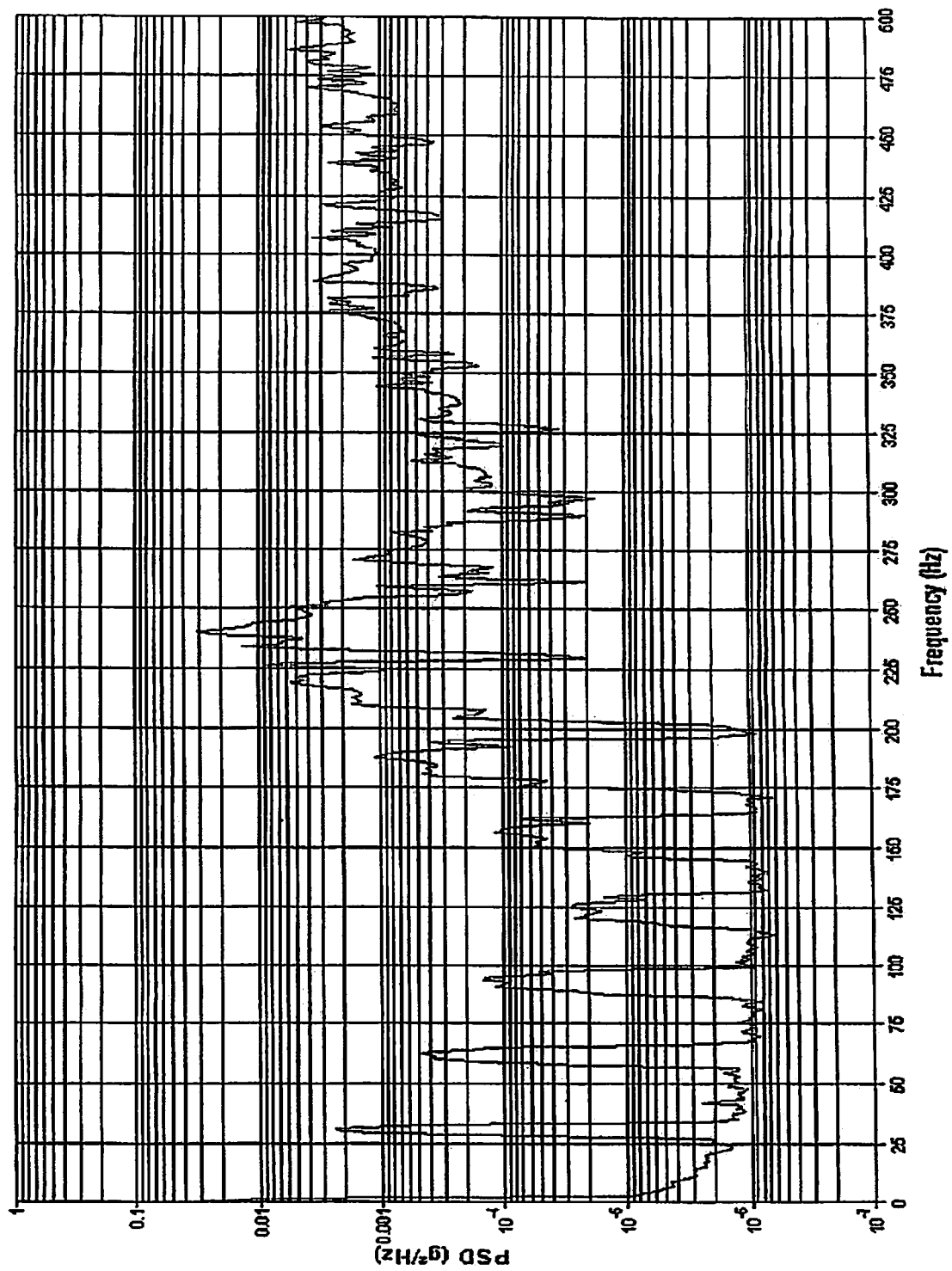
FIG. 18 is a PSD chart of a prior art system modulating the air pressure to the vibrator.
Figure 19:
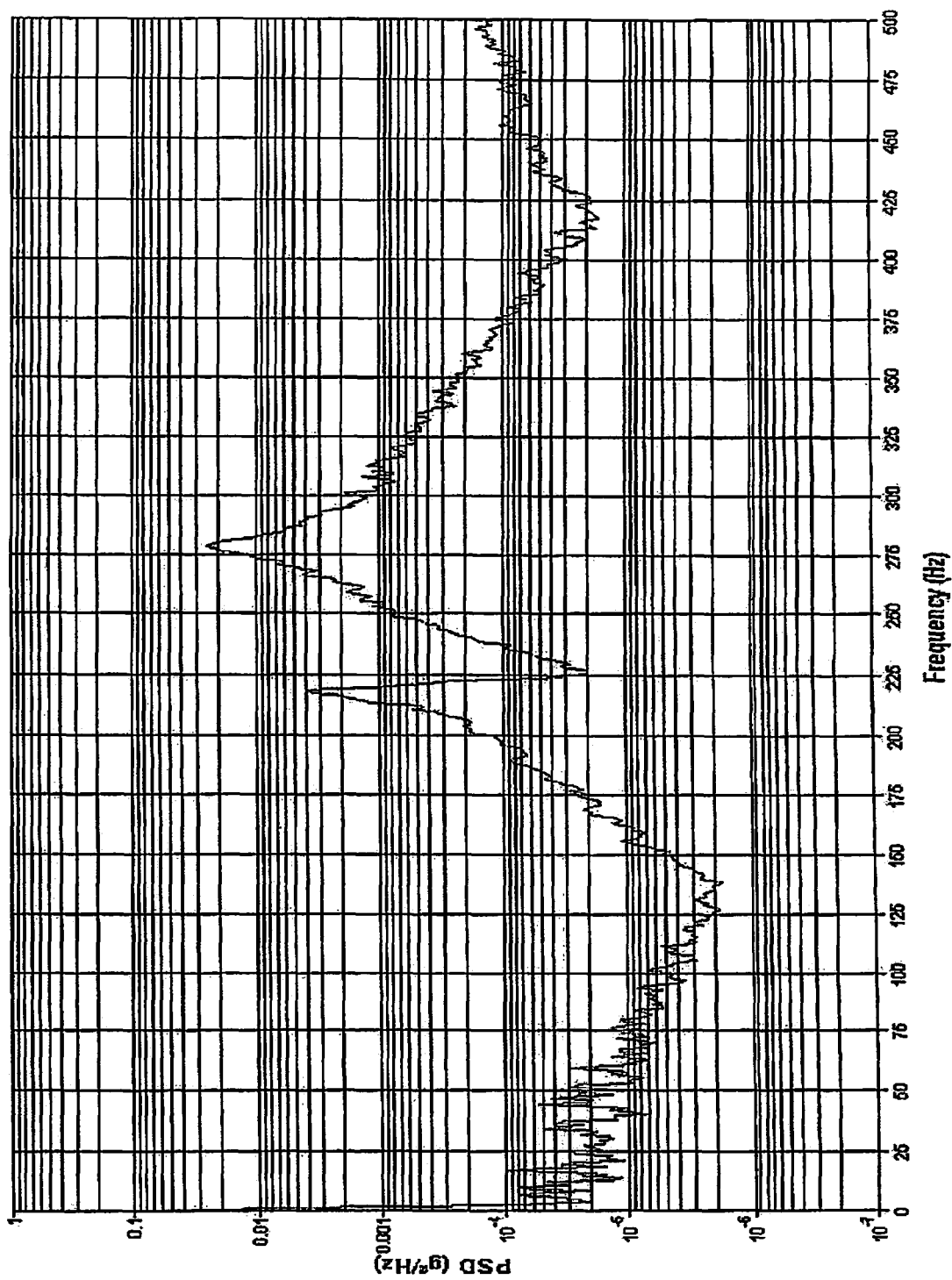
FIG. 19 is a PSD chart of the system of FIG. 1 operating at random frequencies.

While FIGS. 13-16 are useful for showing the flexibility of the described vibrators, they are not representative of how the described vibratory system would be utilized. FIG. 19 shows a PSD chart for the operation of the described system utilizing random frequencies of operation. Compare this chart to the prior art PSD of FIGS. 17 and 18. FIG. 17 is a PSD of the prior art vibrator operating at approximately 30 Hz with a constant air pressure. This shows the typical picket fencing on the PSD that is present with prior art vibrator operation. FIG. 18 shows the prior art vibrator with the air supply pressure being modulated. With the air supply pressure increasing and decreasing the vibrator's operating frequency and amplitude of the impacts also increases and decreases. This tends to reduce peaks and broaden the spikes on the PSD. FIG. 18 shows the improvement over a vibrator operating at a constant air supply pressure but there are still significant spikes to about 250 Hz. With the amplitude and frequency dependent on the air supply pressure to the vibrator, the high operating frequencies tend to dominate the peaks because the greatest amplitude impacts occur at these frequencies. This leads to the usefulness of the current described system where the amplitude of the impact is not dependent on the vibrator operating frequency. The controller does not have to control the operating frequency to a single 10 Hz or 5 Hz operation. The controller can randomly select the operating frequency of the vibrator and maintaining constant amplitude of the impact at any and all operating frequencies. FIG. 19 is the solenoid controlled vibrator operating with random frequencies and shows that the picket fencing caused by the vibrator impacts is substantially reduced.

Figure 20:
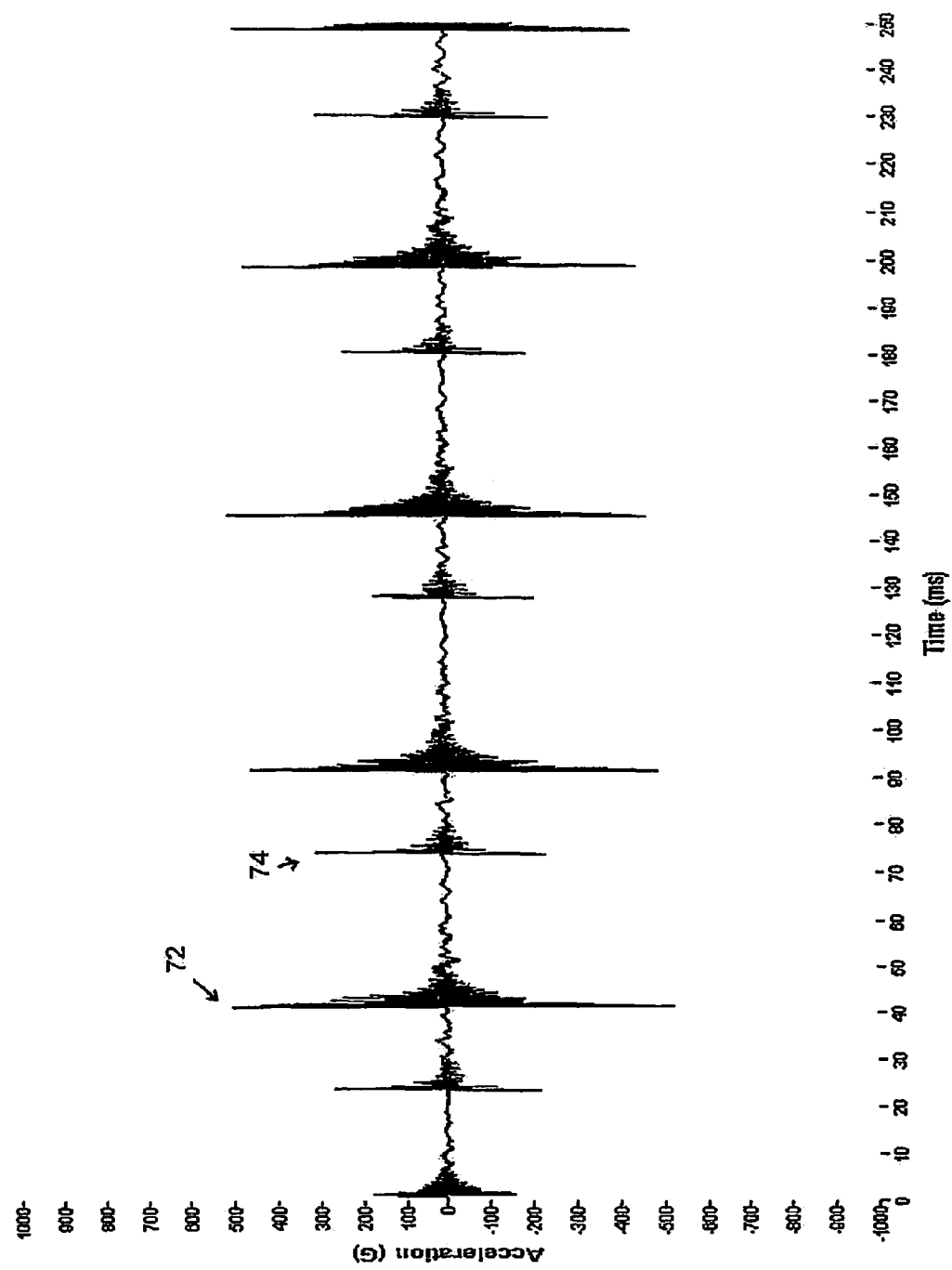
FIG. 20 is an acceleration chart of the result of the system, of FIG. 1 showing single impacts in two directions.
Figure 21:
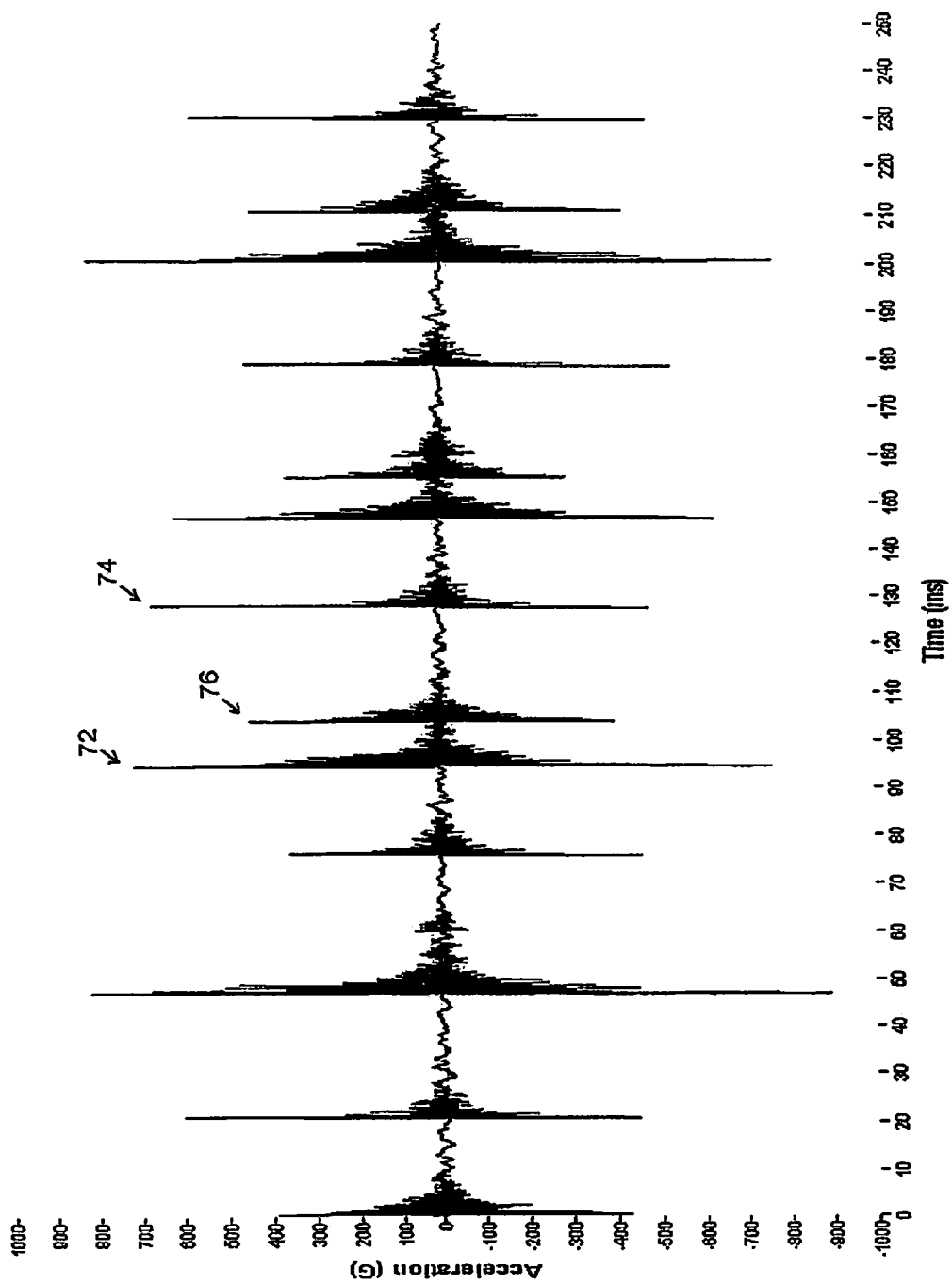
FIG. 21 is an acceleration chart of the result of the system, of FIG. 1 showing multiple impacts in two directions.

Another advantage of the described systems is shown in FIGS. 20 and 21. FIG. 20 shows a Time Domain of the described system where only a primary impact is shown. A primary impact in a first direction 72 is followed by a primary impact 74 in a second direction as air is fed to the vibrator 20 as described above. In comparison, FIG. 21 shows a Time Domain of the described system wherein rebound impacts or secondary impacts are shown. A primary impact in a first direction 72 is followed first by a secondary impact in first direction 76 before the system powers the vibrator in the opposite direction resulting in a primary impact in a second direction 74. This gains the benefit of not only imparting different strength impacts but also allows for more efficient use of the air by allowing more than one impact from a single burst of air.

While the principles of the invention have been shown and described in connection with specific embodiments, it is to be understood that such embodiments are by way of example and are not limiting.

The invention claimed is:

1. A method of operating a vibratory testing apparatus, the method comprising:
   providing a table frame with at least one vibrator attached thereto;
   attaching the at least one vibrator to a solenoid valve, wherein an input of the solenoid valve is connected to a pneumatic air supply and an output of the valve is connected to the at least one vibrator;
   connecting the solenoid valve to a controller;
   sending a first control signal from the controller to the solenoid valve for opening the valve and allowing a first burst of air from the pneumatic air supply to the at least one vibrator thereby causing the at least one vibrator to vibrate the table frame at a first amplitude; and
   sending a second control signal from the controller to the solenoid valve for opening the valve and allowing a second burst of air from the pneumatic air supply to the at least one vibrator thereby causing the at least one vibrator to vibrate the table frame at a second amplitude, wherein the first amplitude is independent of the second amplitude.

2. The method of claim 1 wherein the solenoid valve is a two-way valve.

3. The method of claim 1 wherein the solenoid valve is a four-way valve.

4. The method of claim 1 wherein the at least one vibrator includes:
   a sealed body having first and second ends and defining a cavity therein, the cavity having first and second ends;
   a first air passage in the sealed body near the first end of the body, the first air passage configured to allow gas to flow to and from the first end of the cavity;
   a second air passage in the sealed body near the second end of the body, the second air passage configured to allow gas to flow to and from the second end of the cavity; and
   a piston within the cavity and moveable between the first and second ends.

5. The method of claim 4 wherein the solenoid valve is a four-way solenoid valve including an in port, two in/out ports and an exhaust port, the step of connecting the at least one vibrator to a solenoid valve including connecting the first air passage to a first in/out port and connecting the second air passage to a second in/out port.

6. The method of claim 5 wherein the first burst of air causes the piston to impact the vibrator at the second end of the cavity and the second burst of air causes the piston to impact the vibrator at the first end of the cavity.

7. The method of claim 6 wherein the impact of the piston on the second end of the cavity includes a primary impact and at least one secondary impact.

8. The method of claim 7 wherein the impact of the piston on the first end of the cavity includes a primary impact and at least one secondary impact.

9. The method of claim 5 wherein the controller varies the amount of time between the first burst of air and the second burst of air, thereby varying the amount of times per time period that the piston impacts the ends of the cavity.

10. The method of claim 9 wherein the controller randomly varies the number of impacts per time period.

11. The method of claim 9 further including the step of attaching an accelerometer to the table frame, the accelerometer further attached to the controller, whereby the controller receives data from the accelerometer and varies the amplitude of the impacts by the piston based upon data from the accelerometer.

12. The method of claim 11 wherein the controller independently varies the frequency of the impacts and the amplitude of the impacts.

13. A vibrator system for use with a vibratory testing table, the vibrator system comprising:
   at least one vibrator having a sealed body with first and second ends and defining a cavity therein, the cavity having first and second ends;
   a first air passage in the sealed body near the first end of the body, the first air passage configured to allow gas to flow to and from the first end of the cavity;
   a second air passage in the sealed body near the second end of the body, the second air passage configured to allow gas to flow to and from the second end of the cavity;
   a piston within the cavity and moveable between the first and second ends;

a four-way solenoid valve having an in port, two in/out ports and an exhaust port, the first air passage of the vibrator connected to a first in/out port and the second air passage connected to a second in/out port;

a pneumatic air supply connected to the in port of the four-way solenoid valve; and a controller connected to the four-way solenoid valve, the controller capable of controlling the four-way solenoid valve to allow air from the pneumatic air supply to the vibrator in bursts, a burst moving the piston to impact with the body of the vibrator at one of the ends of the cavity and a subsequent burst moving the piston to impact with the body of the vibrator at the opposite end of the cavity, whereby the frequency of the impacts is controlled via the controller.

14. The vibrator system of claim 13 wherein the controller is capable of controlling the amplitude of the impacts.

15. The vibrator system of claim 14 further including a plurality of vibrators.

16. The vibrator system of claim 15 further comprising a plurality of four-way solenoid valves, each four-way solenoid valve connected to one of the plurality of vibrators and connected to the controller.

17. The vibrator system of claim 16 further including a regulator connected to the system between the pneumatic air supply and the four-way solenoid valves, the regulator controlled by the controller.

18. The vibrator system of claim 16 further including a plurality of two-way solenoid valves, each two-way solenoid valves connected to the system between the pneumatic air supply and a four-way solenoid valve and connected to the controller;

each two-way solenoid valve including an in port connected to the pneumatic air supply and an out port connected to the in port of the four-way solenoid valve.

19. A method of controlling the movement of a piston of a vibrator as part of a vibratory testing apparatus, the method comprising:

providing a vibratory testing apparatus including at least one vibrator, the vibrator including a piston enclosed within a cavity of the vibrator;

providing a power system attached to the vibrator for powering the at least one vibrator ;

providing a controller attached to the power system, the controller capable of controlling the power system;

activating via the controller a first burst of power from the power system to the at least one vibrator, whereby the piston is moved within the cavity to impact within the at least one vibrator at a first amplitude; and activating via the controller a second burst of power from the power system to the at least one vibrator, whereby the piston is moved within the cavity to impact the at least one vibrator at a second amplitude, wherein the second amplitude is independent of the first amplitude;

whereby the controller controls the frequency of impacts by controlling the amount of time between sending the first and second control signals.

20. The method of claim 19 wherein the power system is a pneumatic air system.

21. The method of claim 20 wherein the pneumatic air system includes a pneumatic air supply connected to a four-way solenoid valve, wherein the solenoid valve is connected to the at least one vibrator and to the controller.

22. The method of claim 21 wherein the vibratory testing system includes a plurality of vibrators each connected to the pneumatic air supply via the four-way solenoid valve.

23. The method of claim 21 wherein the pneumatic air system includes a plurality of four-way solenoid valves and plurality of vibrators, wherein each four-way valve is connected to a corresponding vibrator and the controller.

24. The method of claim 23 wherein the pneumatic air system includes a plurality of two-way solenoid valves, wherein each two-way solenoid valve in is connected to the pneumatic air supply, a corresponding four-way solenoid valve and the controller.

* * * * *

UNITED STATES PATENT AND TRADEMARK OFFICE
CERTIFICATE OF CORRECTION

| | | |
|---|---|---|
| PATENT NO. | : 7,861,594 B2 | Page 1 of 1 |
| APPLICATION NO. | : 12/107460 | |
| DATED | : January 4, 2011 | |
| INVENTOR(S) | : Wetzel et al. | |

It is certified that error appears in the above-identified patent and that said Letters Patent is hereby corrected as shown below:

In column 1, line 49, delete "tree" and insert --free--.

In column 2, line 3, delete "die" and insert --the--.

In column 2, line 29, delete "born" and insert --from--.

In column 2, line 63, delete "layout" and insert --in/out--.

In column 3, line 6, delete ", in" and insert --. In--.

In column 3, line 42, delete "outposts" and insert --out ports--.

In column 5, line 42, delete "front" and insert --from--.

In column 5, line 49, after the word "connected" delete ",".

In column 7, line 42, delete "die" and insert --the--.

In column 12, claim 24, line 35, after the word "valve" delete "in".

Signed and Sealed this
Third Day of May, 2011

David J. Kappos
*Director of the United States Patent and Trademark Office*